US012567343B2

(12) United States Patent
Kinoshita et al.

(10) Patent No.: US 12,567,343 B2
(45) Date of Patent: Mar. 3, 2026

(54) INFORMATION PROCESSING DEVICE AND INFORMATION PROCESSING METHOD

(71) Applicant: SONY GROUP CORPORATION, Tokyo (JP)

(72) Inventors: Takashi Kinoshita, Tokyo (JP); Makoto Yamada, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 170 days.

(21) Appl. No.: 18/554,319

(22) PCT Filed: Jan. 28, 2022

(86) PCT No.: PCT/JP2022/003253
§ 371 (c)(1),
(2) Date: Oct. 6, 2023

(87) PCT Pub. No.: WO2022/224523
PCT Pub. Date: Oct. 27, 2022

(65) Prior Publication Data
US 2024/0194093 A1 Jun. 13, 2024

(30) Foreign Application Priority Data

Apr. 21, 2021 (JP) ................................. 2021-071890

(51) Int. Cl.
*G09B 29/10* (2006.01)
*G06T 7/70* (2017.01)
(52) U.S. Cl.
CPC .............. *G09B 29/102* (2013.01); *G06T 7/70* (2017.01); *G06T 2207/30204* (2013.01)

(58) Field of Classification Search
None
See application file for complete search history.

(56) References Cited

U.S. PATENT DOCUMENTS

2004/0080510 A1* 4/2004 Inokuchi ................. G06F 16/29
707/E17.11
2010/0125405 A1* 5/2010 Chae ...................... G06F 3/0486
715/838

(Continued)

FOREIGN PATENT DOCUMENTS

JP 2004-341763 A 12/2004
JP 2020038356 A 3/2020

(Continued)

OTHER PUBLICATIONS

International Search Report and Written Opinion of PCT Application No. PCT/JP2022/003253, issued on May 10, 2022, 09 pages of ISRWO.

*Primary Examiner* — Thomas S Mccormack
(74) *Attorney, Agent, or Firm* — CHIP LAW GROUP

(57) ABSTRACT

Provided is an information processing device including a control unit that identifies, with at least one target, a content for each of the targets, and a reproduction range of the content set in advance, a relative position between the target and a device and compare the reproduction range with the relative position. The information processing device further includes a reproduction unit that reproduces the content on the basis of a result of the comparison between the reproduction range and the relative position.

18 Claims, 34 Drawing Sheets

(56) References Cited

U.S. PATENT DOCUMENTS

| | | | |
|---|---|---|---|
| 2015/0161525 A1* | 6/2015 | Hirose | G06Q 10/02 |
| | | | 705/5 |
| 2021/0080264 A1* | 3/2021 | Sugiura | G01C 21/30 |
| 2021/0397839 A1* | 12/2021 | Qiu | G01C 21/206 |

FOREIGN PATENT DOCUMENTS

| | | | |
|---|---|---|---|
| JP | 2020-198102 A | 12/2020 |
| WO | 2014/129042 A1 | 8/2014 |
| WO | 2016/002285 A1 | 1/2016 |
| WO | 2020/255767 A1 | 12/2020 |

\* cited by examiner

| DEVICE | | TARGET | | VECTOR | |
|---|---|---|---|---|---|
| LATITUDE | LONGITUDE | LATITUDE | LONGITUDE | LATITUDE/LONGITUDE | COORDINATE (m) |
| Lat1 | Lng1 | Lat2 | Lng2 | (Lat1-Lat2,Lng1-Lng2) | (X1,X2) |

*FIG. 20*

| DEVICE | | TARGET | | VECTOR | |
|---|---|---|---|---|---|
| COORDINATE | COORDINATE | COORDINATE | COORDINATE | COORDINATE | COORDINATE (m) |
| x1 | y1 | x2 | y2 | (x1-x2,y1-y2) | (X1,X2) |

| DEVICE | | TARGET | | VECTOR |
|---|---|---|---|---|
| COORDINATE | COORDINATE | COORDINATE | COORDINATE | COORDINATE (m) |
| x1 | y1 | x2 | y2 | (X1,X2) |

| DEVICE | | TARGET | | VECTOR |
|---|---|---|---|---|
| COORDINATE | COORDINATE | COORDINATE | COORDINATE | COORDINATE (m) |
| x1 | y1 | x2 | y2 | (X1,X2) |

FIG. 27A
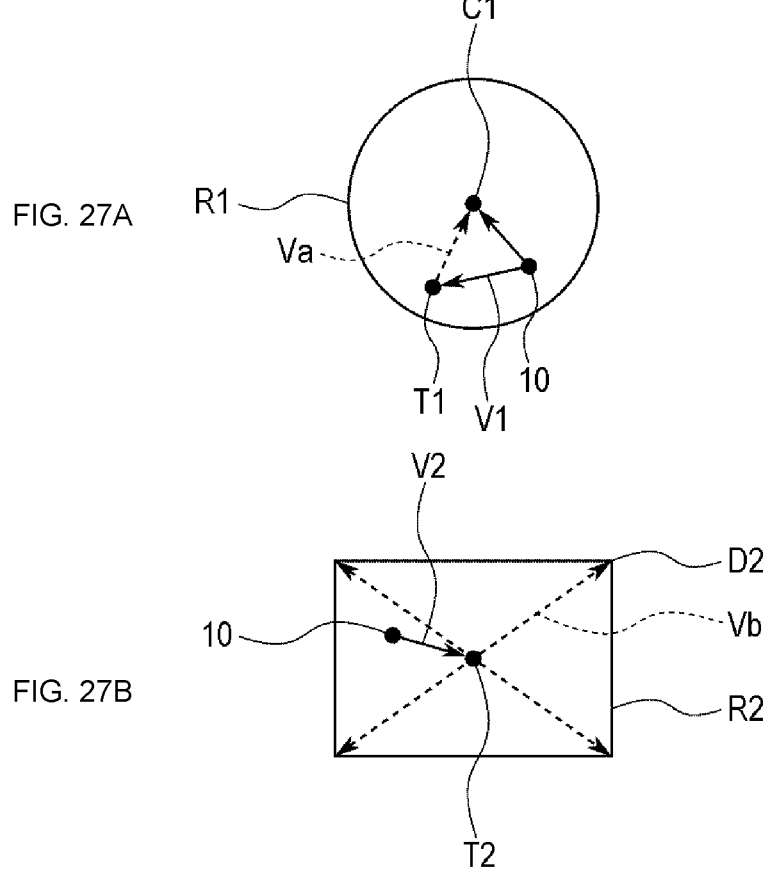
FIG. 27B
FIG. 27C
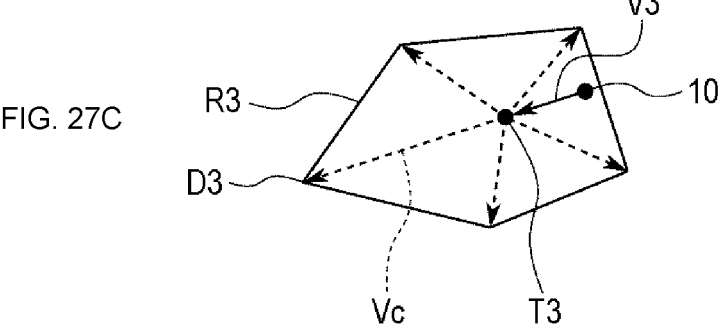

| DEVICE | | TARGET | | VECTOR |
|---|---|---|---|---|
| COORDINATE | COORDINATE | COORDINATE | COORDINATE | COORDINATE (m) |
| x1 | y1 | x2 | y2 | (X1,X2) |

PRESET TARGET RELATIVE POSITIONAL RELATIONSHIP

AUTOMATIC ARRANGEMENT OF TARGETS T3, T4, AND T5 IN A CASE WHERE USER ARRANGES TARGETS T1 AND T2

*FIG. 36*

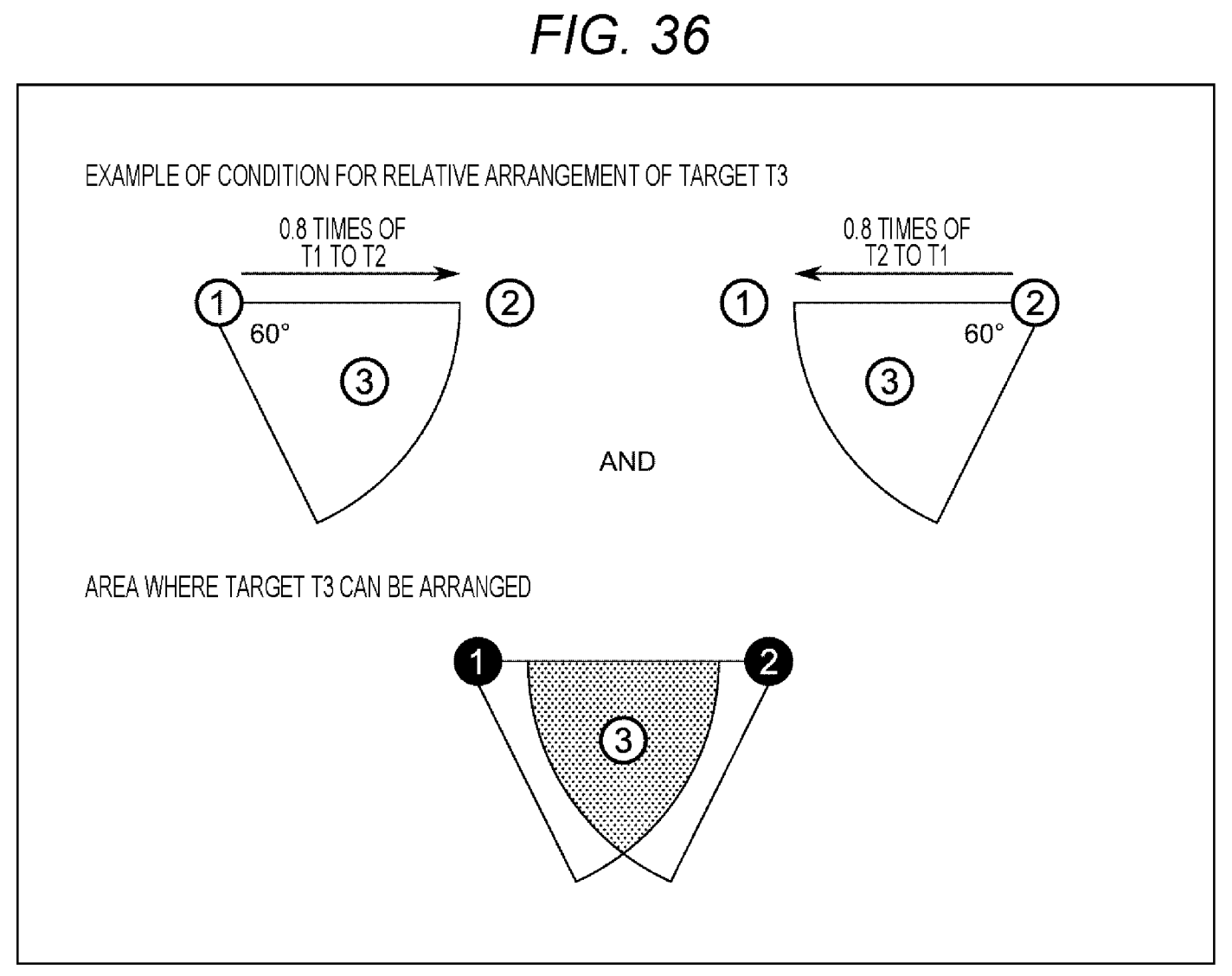

EXAMPLE OF CONDITION FOR RELATIVE ARRANGEMENT OF TARGET T3

0.8 TIMES OF
T1 TO T2

60°

① ② ③

AND 0.8 TIMES OF
T2 TO T1

60°

① ② ③

AREA WHERE TARGET T3 CAN BE ARRANGED

① ② ③

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2022/003253 filed on Jan. 28, 2022, which claims priority benefit of Japanese Patent Application No. JP 2021-071890 filed in the Japan Patent Office on Apr. 21, 2021. Each of the above-referenced applications is hereby incorporated herein by reference in its entirety.

TECHNICAL FIELD

The present disclosure relates to an information processing device, an information processing method, and a program, and more particularly, to an information processing device, an information processing method, and a program that can provide a better user experience.

BACKGROUND ART

Services for providing contents such as images for photography or audio sounds to users who visit places where animations, comics, movies, dramas, or the like were set, users who visit sightseeing spots, and the like have become widespread. Such services are configured as a system for arranging contents at specific places such as an actual location depicted in a work or a sightseeing spot.

As a technique for providing a service using information obtained as a result of user actions, techniques disclosed in Patent Documents 1 and 2 are known, for example.

Patent Document 1 discloses a technique for enabling effective use of various information generated as a result of user actions with the information associated with position information. Patent Document 2 discloses a technique for generating effective navigation information using a user action log.

CITATION LIST

Patent Document

Patent Document 1: International Patent Laid-Open No. 2014/129042

Patent Document 2: International Patent Laid-Open No. 2016/002285

SUMMARY OF THE INVENTION

Problems to be Solved by the Invention

There is a need for a user who visits a specific place to have, using the above-described service for providing contents, a similar experience even in a place of residence, a facility, or the like, but it has been difficult to provide such a similar experience due to various restrictions. It has therefore been required to provide a better user experience.

The present disclosure has been made in view of such circumstances, and it is therefore an object of the present disclosure to provide a better user experience.

Solutions to Problems

An information processing device according to one aspect of the present disclosure includes a control unit configured to identify, with at least one target, a content for each of the targets, and a reproduction range of the content set in advance, a relative position between the target and a device and compare the reproduction range with the relative position, and a reproduction unit configured to reproduce the content on the basis of a result of the comparison between the reproduction range and the relative position.

An information processing method and a program according to one aspect of the present disclosure are an information processing method and a program corresponding to the above-described information processing device according to one aspect of the present disclosure.

In the information processing device, the information processing method, and the program according to one aspect of the present disclosure, with at least one target, a content for each of the targets, and a reproduction range of the content set in advance, a relative position between the target and a device is identified, the reproduction range is compared with the relative position, and the content is reproduced on the basis of a result of the comparison between the reproduction range and the relative position.

Note that the information processing device according to one aspect of the present disclosure may be an independent device or an internal block constituting one device.

BRIEF DESCRIPTION OF DRAWINGS

FIG. 6 is a diagram depicting an example of a device.

FIG. 9 is a diagram depicting an example of a configuration of a server.

FIG. 19 is a diagram depicting an example of a case where a vector indicating the relative position is calculated from latitude and longitude of the target and the device.

FIG. 20 is a diagram depicting an example of a case where a vector indicating the relative position is calculated from coordinates of a generated map.

FIGS. 27A, 27B, and 27C are diagrams depicting an example of a case where the device is within the content reproduction range.

FIG. 36 is a diagram depicting the first example of the automatic target arrangement.

MODE FOR CARRYING OUT THE INVENTION

1. Embodiment of Present Disclosure (Outline of the Present Disclosure)

Services for providing contents such as images for photography or audio sounds to users who visit places where animations, comics, movies, dramas, or the like were set, users who visit sightseeing spots, and the like are available.

Such services can be configured as a system for arranging contents at specific places such as an actual location depicted in a work and a sightseeing spot.

There is a need for a user who visits a specific place using the above-described service to have a similar experience even in a place of residence, a facility, or the like, but it has been difficult to provide such a similar experience due to, for example, the following restrictions.

In other words, in areas where users live, the location of a facility or building where contents are to be arranged is different for each user, so that it takes a lot of working time to an extent that it is practically impossible for a business operator or a creator belonging to a service provider to select and arrange the contents at appropriate places for each user.

Therefore, in order to enable the user himself/herself to arrange the contents, it is necessary to provide a method for editing a content reproduction position (reproduction range) where the user can arrange the contents. A mechanism for obtaining the position of the user and the content reproduction position (reproduction range), however, is different between the outdoors such as a shopping area and an area around a station and the indoors such as a place of residence (the inside of a home) and the inside of a facility, so that it is difficult to perform content reproduction control with the same system.

Figure 1:
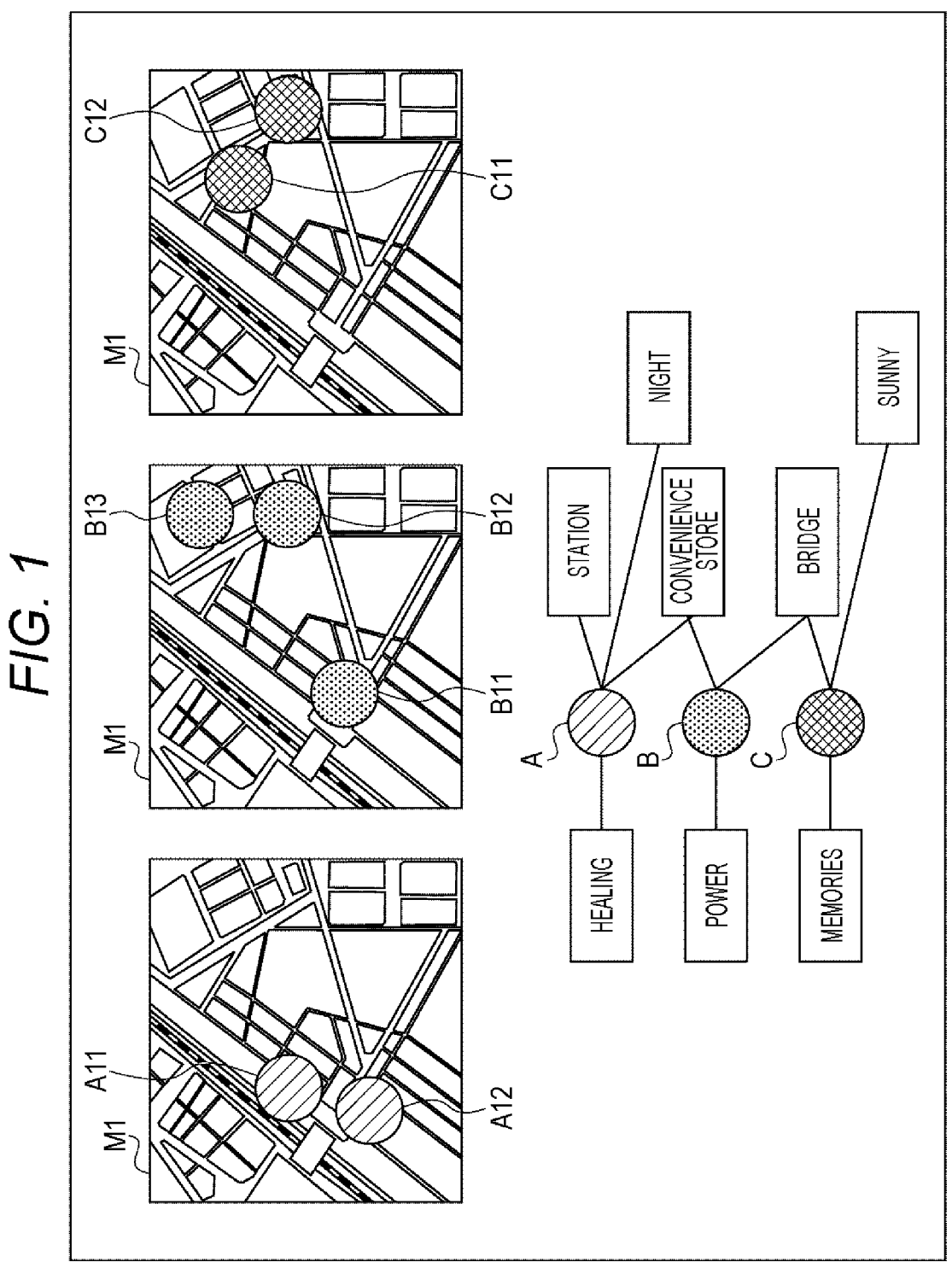
FIG. 1 is a diagram depicting an outline of the present disclosure.

FIG. 1 is a diagram depicting an outline of the present disclosure. In the present disclosure, it is possible to provide a user interface (UI) that enables a user himself/herself to associate a provided content with a reproduction range of the content.

In FIG. 1, a user who has selected a spatial content A for providing a space of "healing" can set a reproduction range of the content by arranging spatial contents A11 and A12 at desired places on a map M1. A user who has selected a spatial content B for providing a space of "power" can set a reproduction range of the content by arranging spatial contents B11 to B13 at desired places on the map M1. A user who has selected a spatial content C for providing a space of "memories" can set a reproduction range of the content by arranging spatial contents C11 and C12 at desired places on the map M1.

Note that a correlation between a classification tag such as an impression given to a spatial content and specific geographic data (natural environment, facility, scenery, or the like), environmental data (weather, time zone, or the like), or the like is acquired and subjected to learning by machine learning. For example, the spatial content A is associated with meta-information such as "station", "night", and "convenience store". The spatial content B is associated with meta-information such as "convenience store" and "bridge". The spatial content C is associated with meta-information such as "bridge" and "sunny". Such pieces of meta-information may be set by the user, the creator, or the like. Note that a stay history of the user at each place or the like may be taken into consideration.

Conventionally, it is required that the user select a desired content and arrange the content at an appropriate place, but there is no data serving as a guide in the currently available position information database (DB), and the creator makes an estimation on the basis of an empirical rule, so that it takes a long time. In contrast, providing the user interface depicted in FIG. 1 allows the user to arrange a desired content at an appropriate place, and in turn allows a reduction in workload of the creator.

Furthermore, it is difficult for the user to independently input what impression or action intention the user has for a specific place, it is possible to prompt, by providing the user interface depicted in FIG. 1, the user to independently input.

Figure 2:
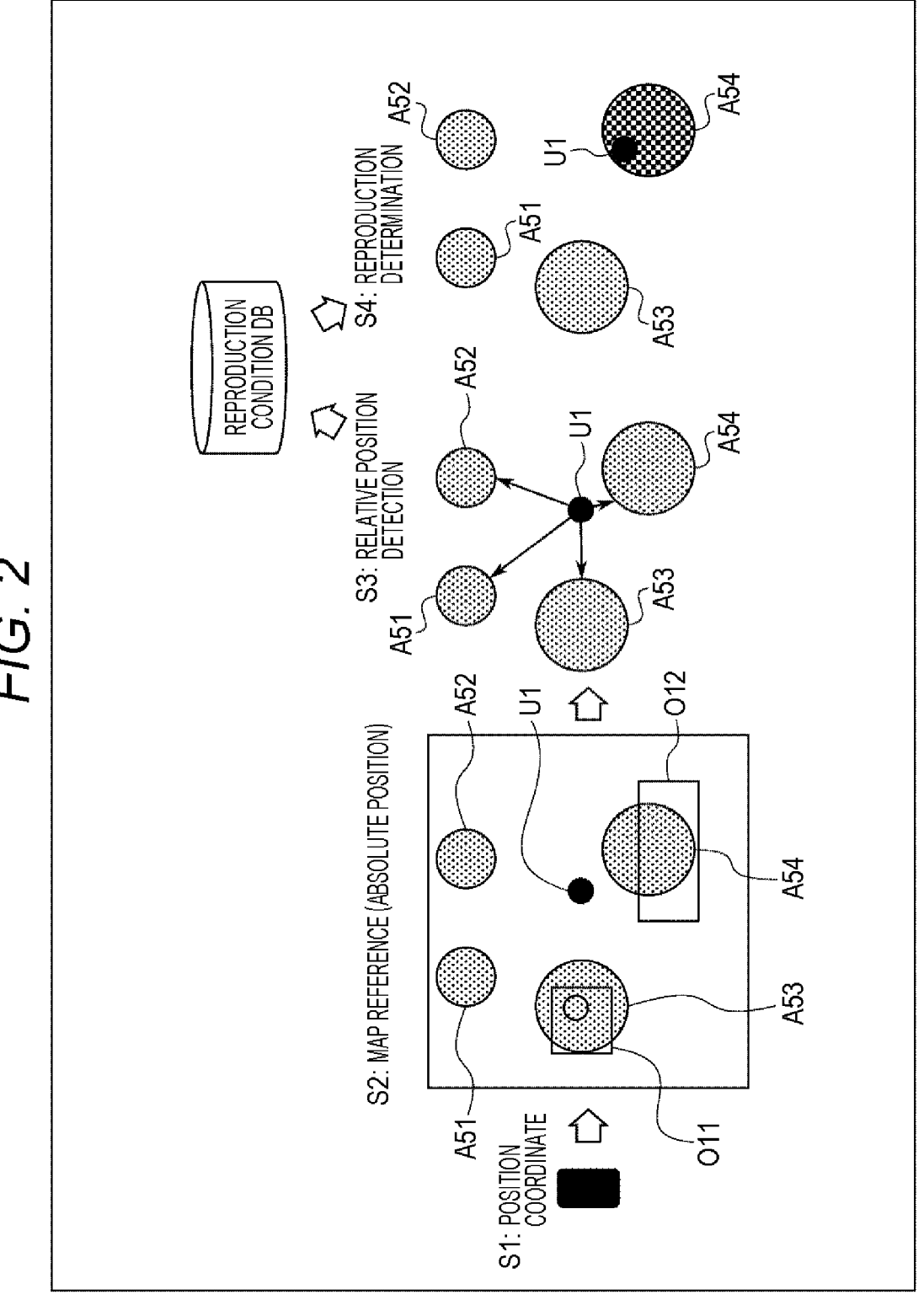
FIG. 2 is a diagram depicting a flow of content reproduction determination using a map reference method.

FIG. 2 is a diagram depicting a flow of content reproduction determination using a map reference method.

In the map reference method, position coordinates of the user are acquired (S1), and a map is referenced on the basis of the position information (S2). Physical objects O11 and 012 are present around a user U1 on the map, and content reproduction ranges A51 to A54 are further set. Then, a relative position between the user U1 and the reproduction ranges A51 to A54 is detected (S3), and content reproduction determination is performed on the basis of a reproduction determination DB (S4). In a case where the user U1 is within the reproduction range A54, a device held by the user U1 reproduces the content.

In this map reference method, it is particularly difficult to acquire map data of a space where privacy exists such as a place of residence (the inside of a home). Furthermore, it is difficult to arrange the content in a spatial environment different for each user while maintaining the content with a certain degree of consistency. Moreover, it is difficult for the user himself/herself to arrange the content.

Figures 3A, 3B:
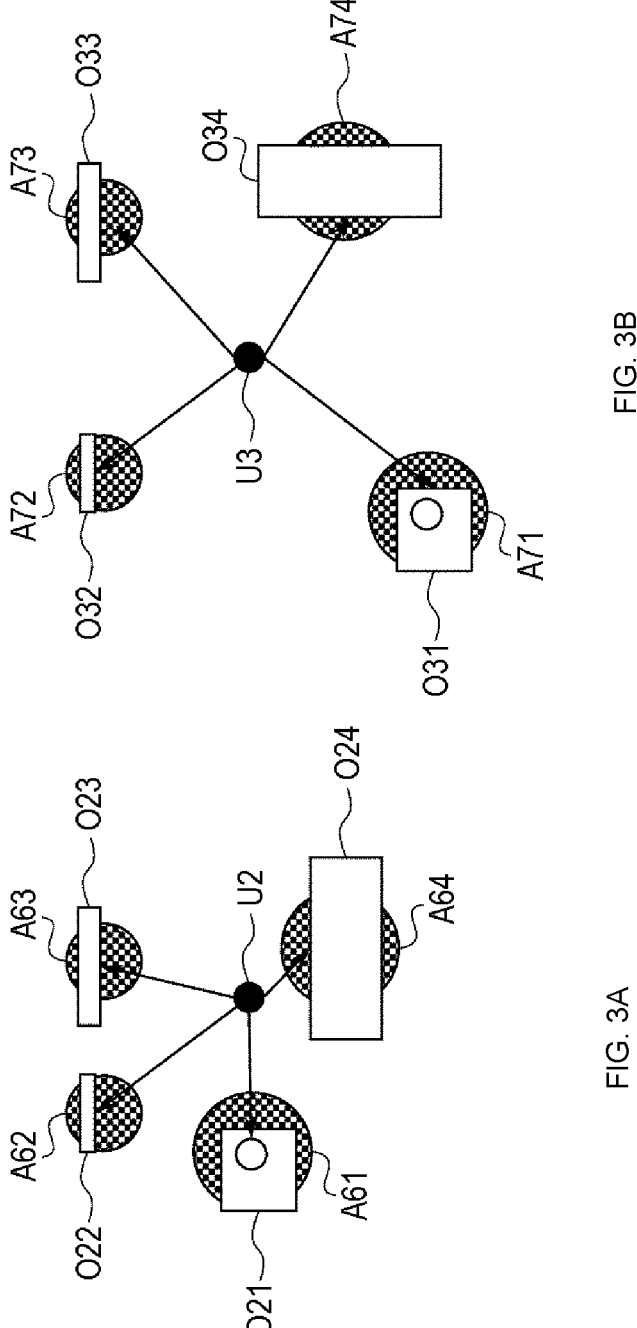
FIGS. 3A and 3B are diagrams depicting an outline of a relative position direct detection method used in the present disclosure.

FIGS. 3A and 3B are diagrams depicting an outline of a relative position direct detection method used in the present disclosure.

In the relative position direct detection method, data (topology data) using a relative positional relationship between a user and a target object including a physical object, a structure, or the like common among the users as a reproduction condition is generated.

In FIG. 3A, in a case where target objects O21 to O24 are present, the content reproduction determination is performed using a relative positional relationship between a user U2 and each of the target objects O21 to O24. Reproduction ranges A61 to A64 are set for the target objects O21 to O24, respectively, and when the user U2 enters the reproduction ranges, a device held by the user U2 reproduces the content.

In FIG. 3B, in a case where target objects O31 to O34 are present, the content reproduction determination is performed using a relative positional relationship between a user U3 and each of the target objects O31 to O34. Reproduction ranges A71 to A74 are set for the target objects O31 to O34, respectively, and when the user U2 enters the reproduction ranges, a device held by the user U3 reproduces the content.

At this time, the user can arrange a desired content at an appropriate place such as an area around the target object according to each environment. Furthermore, the use of the relative positional relationship between the user and the target object eliminates the need of map data on a place where the user is present such as a place of residence (the inside of a home) and thus allows privacy to be protected. The target object such as a common physical object or structure can be designated with a highly abstract name such as "door" or "poster". Note that the target object may be provided to the user as an item such as a product.

Since the relative position direct detection method can be used for not only the indoors such as a place of residence (the inside of a home) but also the outdoors, it is possible to perform content reproduction control with the same system by making the mechanism for obtaining the position of the user and the content reproduction position (reproduction range) common between the outdoors and the indoors.

Furthermore, there is a limit on the number of contents the user himself/herself can arrange at desired places because places where the contents are arranged are limited. On the other hand, for a content that cannot be arranged by the user, it is expected that the system automatically arrange the content, but it is difficult to automatically arrange the content while maintaining a relationship between contents predetermined by the creator and in a manner adapted to the real environment.

Figure 4:
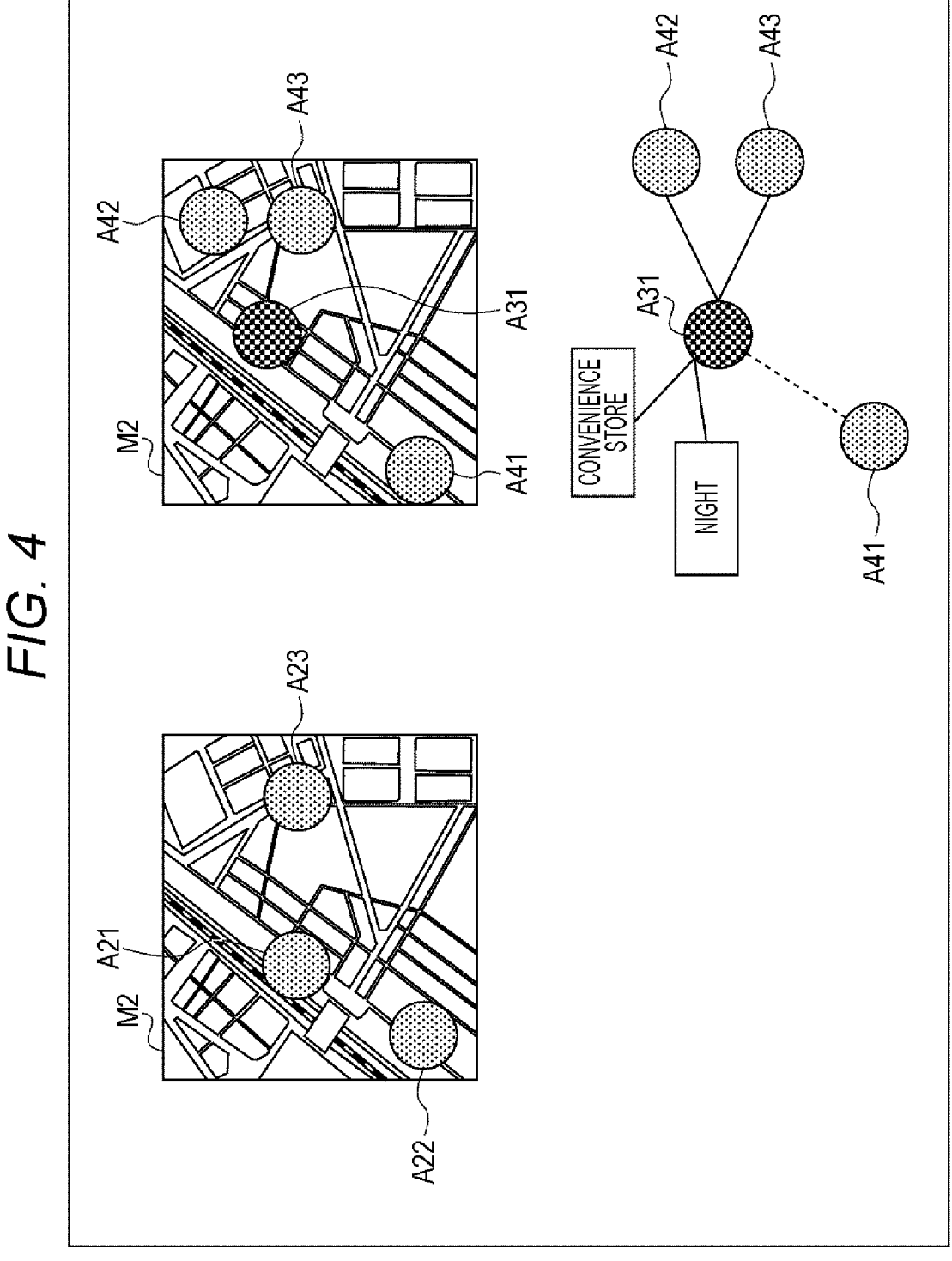
FIG. 4 is a diagram depicting an outline of the present disclosure.

FIG. 4 is a diagram depicting an outline of the present disclosure. In the present disclosure, it is possible to provide a content suitable for arrangement on the basis of the details and positions of contents already arranged by the user.

In FIG. 4, the user can set, by arranging spatial contents A21 to A23 at desired places on a map M2, reproduction ranges of the contents as described above, but there is a limit on the number of spatial contents that can be arranged. Therefore, in the present disclosure, a relationship (proximity) between spatial contents is set in advance, and the spatial contents are automatically arranged according to the relationship.

In FIG. 4, when the user arranges spatial contents A41 to A43 on the map M2, a spatial content A31 is automatically arranged using a relative positional relationship among the spatial contents A41 to A43. When the spatial content A31 is automatically arranged, a more closely relevant spatial content may be arranged using meta-information such as geographic data such as "convenience store" or environmental data such as "night". It is therefore possible to automatically generate a content intended by the creator in a manner unexpected by the user and adapted to the real environment.

The outline of the present disclosure has been described above. Hereinafter, an embodiment of the present disclosure will be described with reference to the drawings.

(Outline of System)

Figure 5:
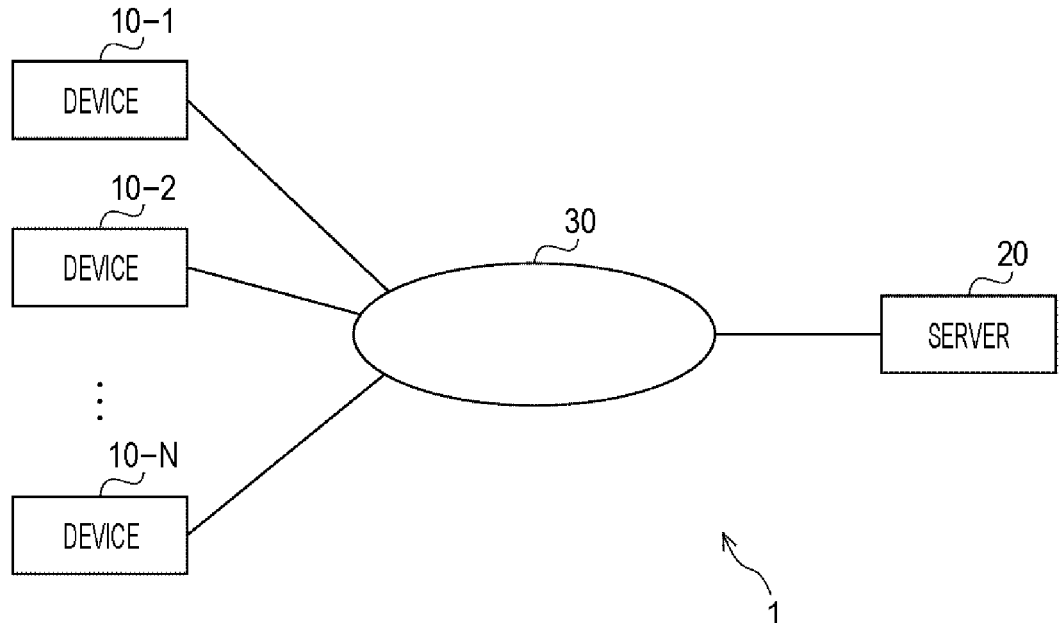
FIG. 5 is a diagram depicting an example of a configuration of an information processing system to which the present disclosure is applied.

FIG. 5 is a diagram depicting an example of a configuration of an information processing system to which the present disclosure is applied.

An information processing system 1 is a system that provides spatial contents. The information processing system 1 includes devices 10-1 to 10-N(N is an integer greater than or equal to 1) and a server 20. Each of the devices 10-1 to 10-N and the server 20 are mutually connected via a network 30 including the Internet or the like.

The device 10-1 includes an information device such as a smartphone, a mobile phone, a tablet terminal, a wearable device, a portable music player, a gaming console, or a personal computer (PC). The device 10-1 exchanges data with the server 20 via the network 30, and reproduces a spatial content when a predetermined condition is satisfied.

The devices 10-2 to 10-N, as with the device 10-1, each include an information device such as a smartphone and reproduces a spatial content when a predetermined condition is satisfied. Note that, in the following description, the devices 10-1 to 10-N will be referred to as device 10 unless there is a particular need to distinguish the devices.

The server 20 provides various data to the devices 10-1 to 10-N via the network 30. For example, the server 20 is configured as an application server, a distribution server, a user server, or the like. Note that a plurality of servers is provided in practice, each of the servers being provided for a corresponding function (service) to be provided, but only one server is depicted in FIG. 5 for the sake of simplification of description.

The application server distributes an application used to access a spatial content service. The distribution server distributes a spatial content created by the creator. The user server accumulates spatial contents edited by the user. Such servers are managed by the business operator belonging to the service provider.

(Configuration of Device)

Figure 6:
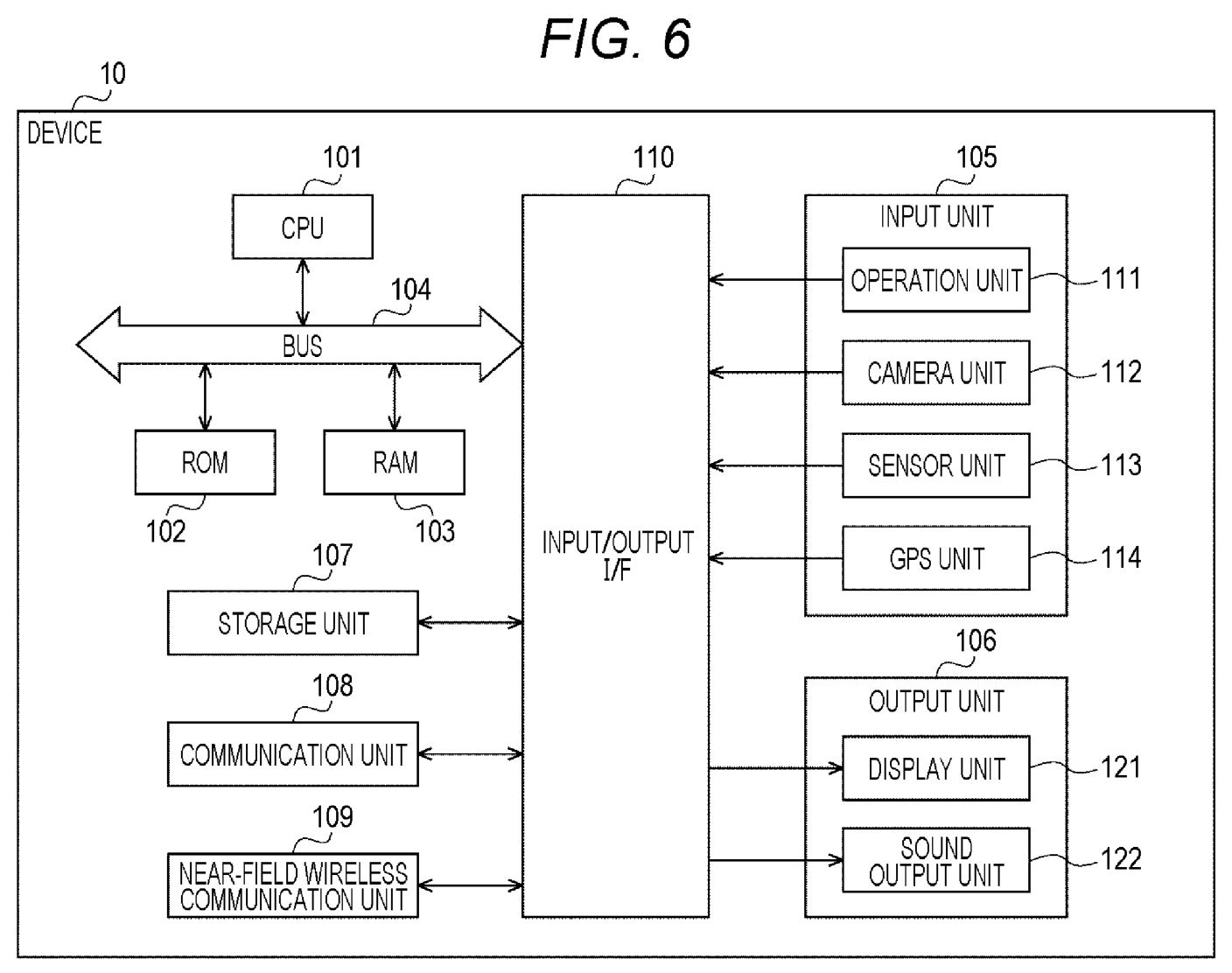

FIG. 6 is a diagram depicting an example of the device 10 depicted in FIG. 5. The device 10 is an example of an information processing device to which the present disclosure is applied.

As depicted in FIG. 6, in the device 10, a central processing unit (CPU) 101, a read only memory (ROM) 102, and a random access memory (RAM) 103 are mutually connected by a bus 104.

The CPU 101 controls operation of each unit of the device 10 by executing a program recorded in the ROM 102 or a storage unit 107. Various data are appropriately stored in the RAM 103.

An input/output interface 110 is further connected to the bus 104. An input unit 105, an output unit 106, the storage unit 107, a communication unit 108, and a near-field wireless communication unit 109 are connected to the input/output interface 110.

The input unit 105 supplies various input signals to each unit including the CPU 101 via the input/output interface 110. For example, the input unit 105 includes an operation unit 111, a camera unit 112, a sensor unit 113, and a GPS unit 114.

The operation unit 111 is operated by the user and supplies an operation signal corresponding to the operation to the CPU 101. The operation unit 111 includes a physical button, a touch panel, and the like.

The camera unit 112 photoelectrically converts light incident on the camera unit 112 from a subject, performs signal processing on an electric signal obtained as a result the photoelectric conversion to generate a captured image signal, and outputs the captured image signal. The camera unit 112 includes an image sensor, a signal processing unit, and the like.

The sensor unit 113 performs sensing of space information, time information, and the like, and outputs a sensor signal obtained as a result of the sensing.

The sensor unit 113 includes an acceleration sensor, a gyro sensor, and the like. The acceleration sensor measures acceleration in three directions of XYZ axes. The gyro sensor measures angular velocity of three axes of the XYZ axes. Note that an inertial measurement unit (IMU) may be provided to measure three-dimensional acceleration and angular velocity with a three-directional accelerometer and a three-axis gyroscope.

Furthermore, the sensor unit 113 can include various sensors such as a biological sensor that measures information such as a heart rate, a body temperature, or a posture of a living thing, a proximity sensor that measures a nearby object, and a magnetic sensor that measures a magnitude and a direction of a magnetic field (magnetic field).

The GPS unit 114 receives a signal from a global positioning system (GPS) satellite, determines the current position, and outputs the resultant signal indicating the current position. Note that the GPS is an example of a positioning system, and other positioning systems may be used.

The output unit 106 outputs various information via the input/output interface 110 under the control of the CPU 101. For example, the output unit 106 includes a display unit 121 and a sound output unit 122.

The display unit 121 displays an image, a video, or the like corresponding to an image signal under the control of the CPU 101. The display unit 121 includes a panel unit such as a liquid crystal panel or an organic light emitting diode (OLED) panel, a signal processing unit, and the like.

The sound output unit 122 outputs a sound corresponding to a sound signal under the control of the CPU 101. The sound output unit 122 includes a speaker, a headphone connected to an output terminal, and the like.

The storage unit 107 records various data and programs under the control of the CPU 101. The CPU 101 reads, from the storage unit 107, and processes various data, and executes a program.

The storage unit 107 is configured as an auxiliary storage device such as a semiconductor memory. The storage unit 107 may be configured as an internal storage or may be an external storage such as a memory card.

The communication unit 108 communicates with other devices via the network 30 under the control of the CPU 101. The communication unit 108 is configured as a communication module compatible with cellular communication (for example, LTE-Advanced, 5G, or the like), wireless communication such as a wireless local area network (LAN), or wired communication.

The near-field wireless communication unit 109 performs wireless communication according to a near-field wireless communication standard such as Bluetooth (registered trademark) or near field communication (NFC), and exchanges various data.

Note that the configuration of the device 10 depicted in FIG. 6 is an example, and for example, a microphone may be provided as the input unit, an image processing unit such as a graphics processing unit (GPU) or the like may be provided.

Figure 7:
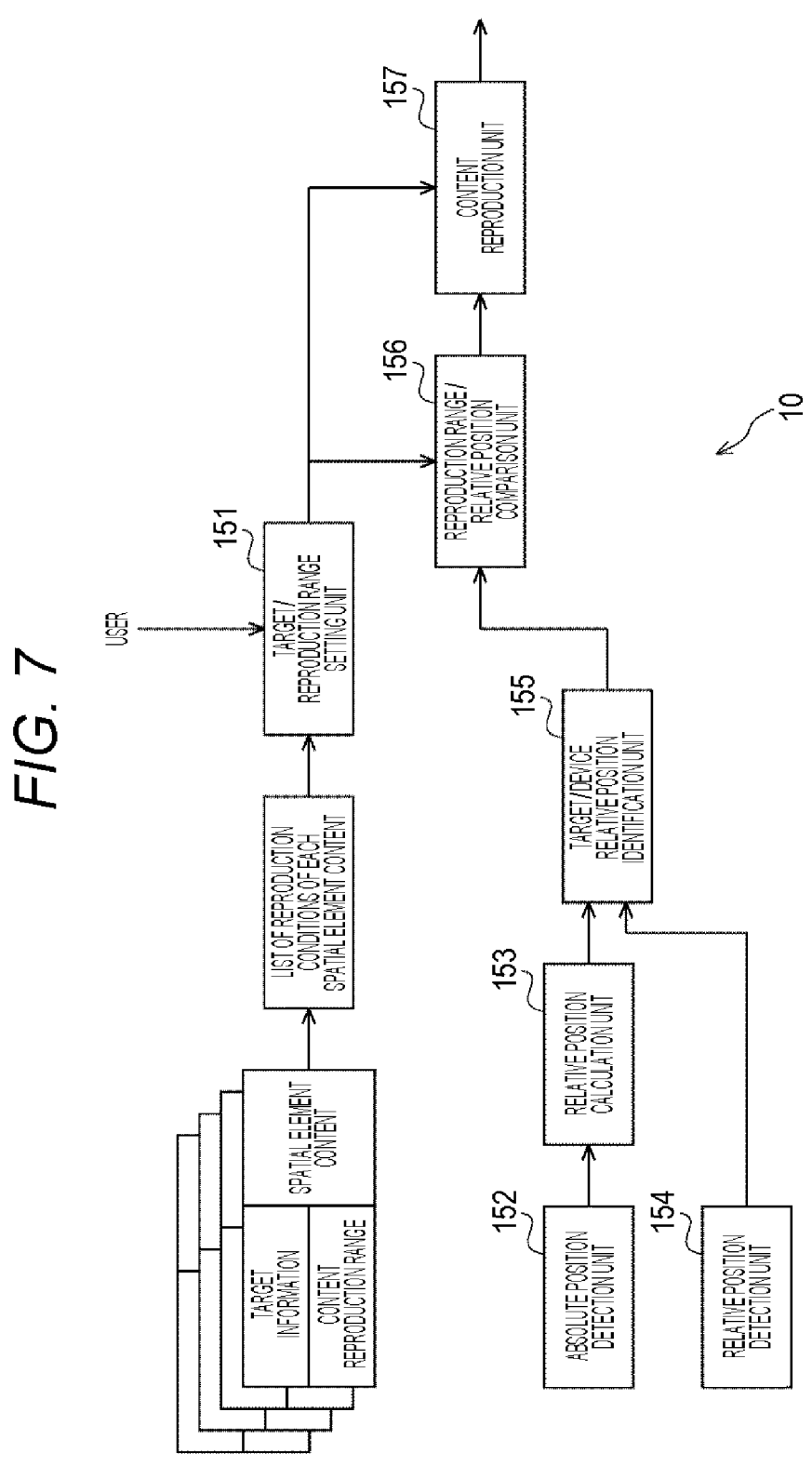
FIG. 7 is a diagram depicting an example of a functional configuration of the device.

FIG. 7 is a diagram depicting an example of a functional configuration of the device 10 depicted in FIG. 6.

In FIG. 7, the device 10 includes a target/reproduction range setting unit 151, an absolute position detection unit 152, a relative position calculation unit 153, a relative position detection unit 154, a target/device relative position identification unit 155, a reproduction range/relative position comparison unit 156, and a content reproduction unit 157. Note that a control unit is implemented by a program executed by the CPU 101, and the control unit includes at least functions as the target/reproduction range setting unit 151, the target/device relative position identification unit 155, and the reproduction range/relative position comparison unit 156.

The target/reproduction range setting unit 151 sets a position of a target according to a spatial element content reproduction position and a content reproduction range that is a range where the spatial element content is reproduced according to the operation made by the user.

Here, the spatial content includes at least one spatial element content. The spatial content is an outdoor content designed to be used outdoors, but the use of the technology according to the present disclosure makes the spatial content available indoors. The spatial content provides a space based on a theme such as "healing", "power", or "memories" by means of a sound such as a stereophonic sound, a video, an image, or the like. For example, a spatial content corresponding to "healing" includes spatial element contents such as "Bird", "Forest", "Creek", and the like.

The spatial element content corresponding "Bird" provides the user with a space of "healing" by means of, for example, a pleasant birdsong. The spatial element content corresponding to "Forest" provides the user with a space of "healing" by means of a sound that can make the user feel a forest, such as a sound of wind shaking leaves of a tree. The spatial element content corresponding "Creek" provides the user with a space of "healing" by means of a sound of water such as a gentle creek flow.

The spatial element content reproduction position is determined by means of the position of the target that can be arranged by the user. That is, the target indicates where the user can reproduce the spatial element content using the device 10.

The content reproduction range and target information are associated with the spatial element content arranged as the target. The content reproduction range is a range where the spatial element content is reproduced, and has a predetermined shape such as a circle, a polygon, a sphere, or a polyhedron. The target information is information used for associating the target object such as a physical object or an item with the target. The content reproduction range and the target information are set by the user, a business operator that sells items, or the like.

For example, in a case where the position of the target, the content reproduction range, the target information, and the like are set by the user, various settings may be made using a presented list of reproduction conditions of each spatial element content. The target/reproduction range setting unit 151 supplies setting information set by the user to the reproduction range/relative position comparison unit 156 and the content reproduction unit 157.

The absolute position detection unit 152 detects an absolute position of the device 10 and supplies the detection result to the relative position calculation unit 153. The relative position calculation unit 153 calculates a relative position between the target and the device 10 on the basis of the detection result from the absolute position detection unit 152, and supplies the calculation result to the target/device relative position identification unit 155.

The relative position detection unit 154 detects the relative position between the target and the device 10, and supplies the detection result to the target/device relative position identification unit 155.

At least one of the calculation result from the relative position calculation unit 153 or the detection result from the relative position detection unit 154 is supplied to the target/device relative position identification unit 155. The target/device relative position identification unit 155 identifies information (vector or the like) indicating the relative position between the target and the device 10 on the basis of at least one of the calculation result or the detection result, and supplies the identification result to the reproduction range/relative position comparison unit 156. It can be said that the relative position between the target and the device 10 is a position of the device 10 relative to the target.

Information indicating the content reproduction range from the target/reproduction range setting unit 151 and information indicating the relative position from the target/device relative position identification unit 155 are supplied to the reproduction range/relative position comparison unit 156. The reproduction range/relative position comparison unit 156 compares the content reproduction range with the relative position between the target and the device to determine whether or not the relative position is within the content reproduction range, and supplies the determination result to the content reproduction unit 157.

In a case where the determination result supplied from the reproduction range/relative position comparison unit 156 indicates that the relative position is within the content reproduction range, the content reproduction unit 157 reproduces the spatial element content. The spatial element content to be reproduced is identified on the basis of the setting information regarding the target supplied from the target/reproduction range setting unit 151. Data of the spatial element content may be distributed by streaming from the server 20 or may be downloaded together with the application or the like.

Figure 8:
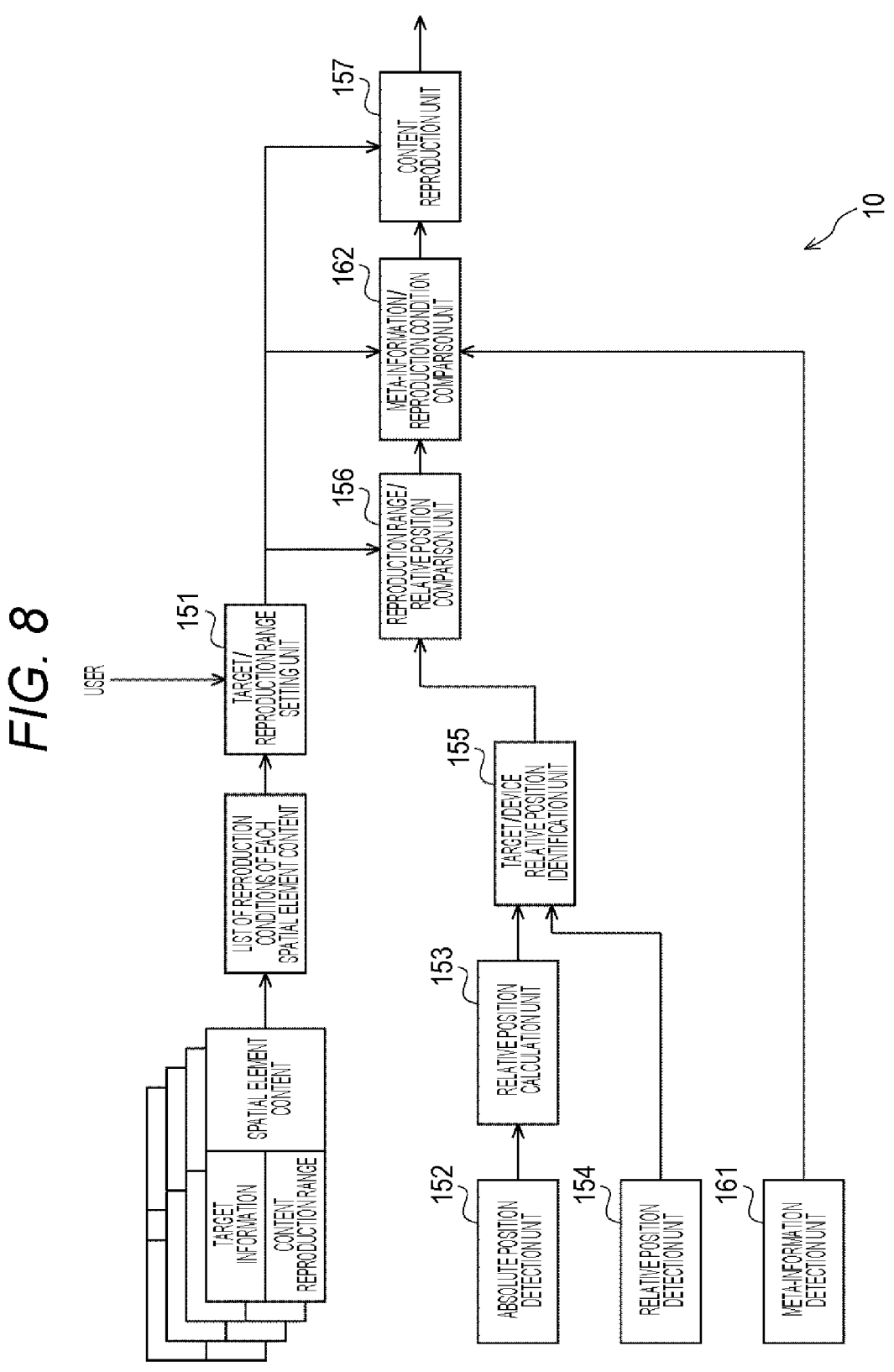
FIG. 8 is a diagram depicting another example of the functional configuration of the device.

FIG. 8 is a diagram depicting another example of the functional configuration of the device 10 depicted in FIG. 6.

The configuration depicted in FIG. 8 is different from the configuration depicted in FIG. 7 in that a meta-information detection unit 161 and a meta-information/reproduction condition comparison unit 162 are additionally provided. In FIG. 8, portions corresponding to those depicted in FIG. 7 are denoted by the same reference numerals, and the description thereof will be omitted as appropriate. Note that the control unit includes at least functions as the target/reproduction range setting unit 151, the target/device relative position identification unit 155, the reproduction range/relative position comparison unit 156, the meta-information detection unit 161, and the meta-information/reproduction condition comparison unit 162.

The target/reproduction range setting unit 151 sets meta-information as a reproduction condition for each target according to the operation made by the user or the like, in addition to the settings of the target position, the content reproduction range, and the like. The target/reproduction range setting unit 151 supplies the setting information regarding the reproduction condition to the meta-information/reproduction condition comparison unit 162.

For example, the meta-information includes a time zone (7:00-9:00, AM/PM, or the like), a schedule of the user, weather (sunny, rainy, cloudy, strong wind, or the like), a population density of a surrounding area (50 people or more within 100, or the like), information regarding a facility (convenience store or the like) on the map, target arrangement information of another user, and the like. The meta-information set as the reproduction condition may be set by the business operator, the creator, or the like.

The meta-information detection unit 161 detects the meta-information and supplies the detection result to the meta-information/reproduction condition comparison unit 162.

The determination result from the reproduction range/relative position comparison unit 156, the setting information from the target/reproduction range setting unit 151, and the detection result from the meta-information detection unit 161 are supplied to the meta-information/reproduction condition comparison unit 162. In a case where the determination result indicates that the relative position is within the content reproduction range, the meta-information/reproduction condition comparison unit 162 determines whether or not the reproduction condition is satisfied by comparing the detected meta-information with the meta-information set as the reproduction condition, and supplies the determination result to the content reproduction unit 157.

In a case where the determination result supplied from the meta-information/reproduction condition comparison unit 162 indicates that the reproduction condition is satisfied, the content reproduction unit 157 reproduces the spatial element content.

As described above, adding not only the determination as to whether or not the relative position is within the content reproduction range but also the determination with the meta-information added for each target as to whether or not the reproduction condition is satisfied makes it possible to reproduce the spatial element content according to the environment or context when the relative position is within the content reproduction range.

(Configuration of Server)

Figure 9:
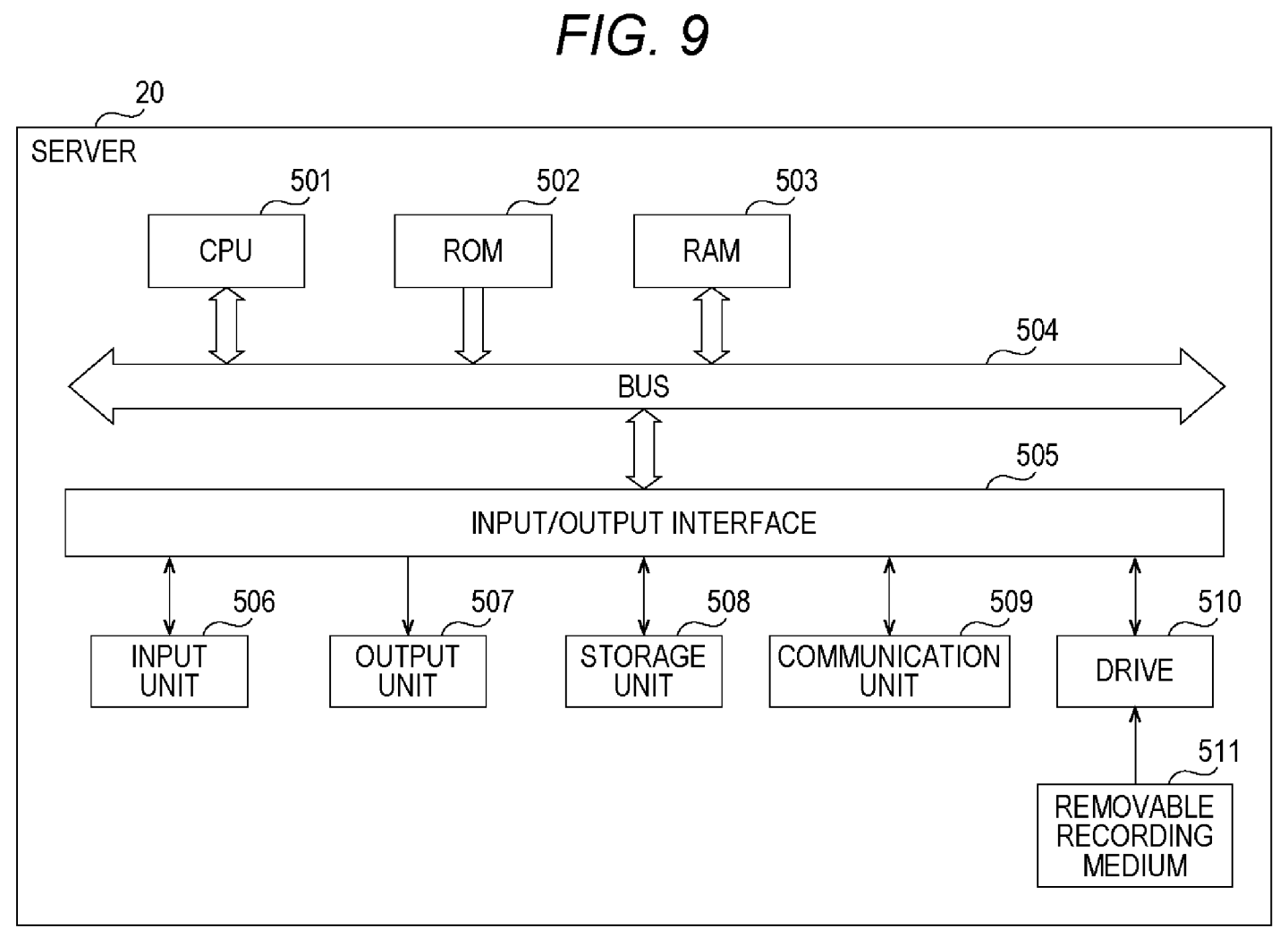

FIG. 9 is a diagram depicting an example of a configuration of the server 20 in FIG. 5.

In the server 20, a CPU 501, a ROM 502, and a RAM 503 are mutually connected by a bus 504. Moreover, an input/output interface 505 is connected to the bus 504. An input unit 506, an output unit 507, a storage unit 508, a communication unit 509, and a drive 510 are connected to the input/output interface 505.

The input unit 506 includes a microphone, a keyboard, a mouse, and the like. The output unit 507 includes a speaker, a display, and the like.

The storage unit 508 includes a hard disk drive (HDD), a semiconductor memory, or the like. The communication unit 509 is configured as a communication module compatible with wireless communication such as a wireless LAN or wired communication such as Ethernet (registered trademark).

The drive 510 drives a removable recording medium 511 such as a semiconductor memory, an optical disc, a magnetic disk, or a magneto-optical disk.

The server 20 is configured as a server that provides various functions (services) such as an application server, a distribution server, or a user server. The function provided by the server 20 configured as each server is implemented by a program corresponding to the function executed by the CPU 501.

(Flow of Processing)

Figure 10:
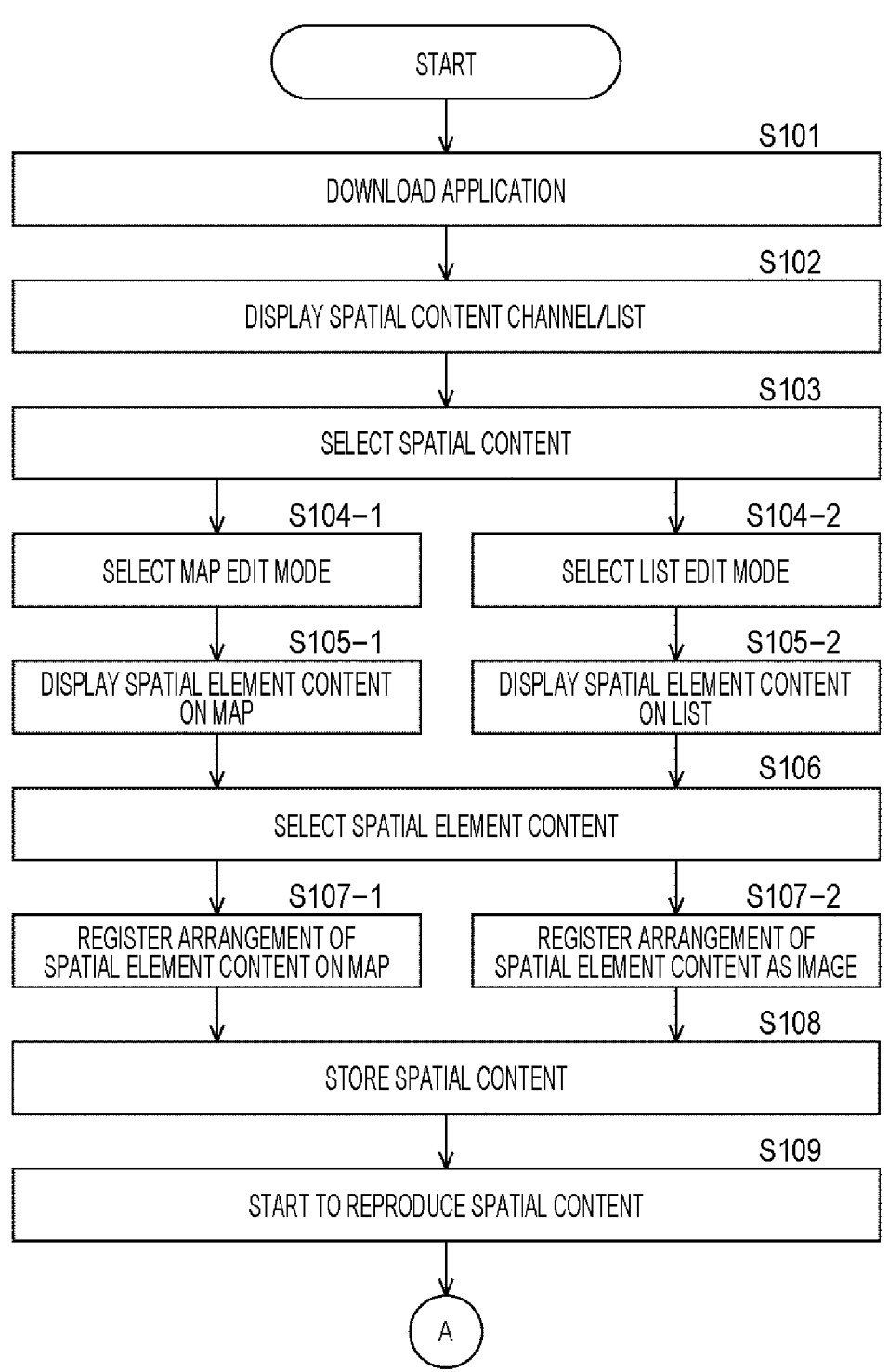
FIG. 10 is a flowchart for describing a flow of processing to be performed by the device.

Next, a flow of processing performed by the device 10 will be described with reference to a flowchart in FIG. 10. Note that processes after step S109 in FIG. 10 are depicted in a flowchart in FIG. 17.

In step S101, the communication unit 108 accesses the server 20 via the network 30 to download an application under the control of the CPU 101. The downloaded application is stored in the storage unit 107 and executed by the CPU 101.

In step S102, the display unit 121 displays a spatial content channel/list under the control of the CPU 101 that executes the application.

In step S103, the target/reproduction range setting unit 151 selects a spatial content the according to the operation made by the user. For example, as the spatial content, a content based on a spatial theme such as "healing", "power", or "memories" is selected. For the selected spatial content, how the spatial content is arranged outdoors and how the spatial content is arranged when the spatial content is brought indoors are set.

Note that, in the following description, an example will be described where an arrangement in a case where the spatial content is used outdoors is set by means of editing to which a "map edit mode" is applied, and an arrangement in a case where the spatial content is brought indoors is set by means of editing to which a "list edit mode" is applied; however, how the edit mode is applied when editing the spatial content is not limited to the above. That is, the "map edit mode" can be applied to a "place where the map is provided in advance", and the "list edit mode" can be applied to a "place where the map is not provided in advance". For example, the "map edit mode" is applicable to not only a case where the spatial content is used outdoors, but also a case where the spatial content is used in a facility or the like where an indoor map is provided. The "list edit mode" is applicable to not only a case where the spatial content is used indoors, but also a case where the spatial content is set at a target that is not displayed on the map, such as an outdoor bench.

In setting the arrangement in a case where the spatial content is used outdoors, the target/reproduction range setting unit 151 performs processes of steps S104-1 to S108 on the left side of FIG. 10.

That is, the map edit mode is selected (S104-1), and the spatial element content is displayed on the map (S105-1). The spatial element content is selected according to the operation made by the user on the spatial element content on the map (S106), and the arrangement of the spatial element content at this time is registered on the map (S107-1). Information regarding the spatial content set as described above (information such as latitude and longitude indicating the position of the target and a radius indicating the content reproduction range) is stored in the storage unit 107 (S108).

Figure 11:
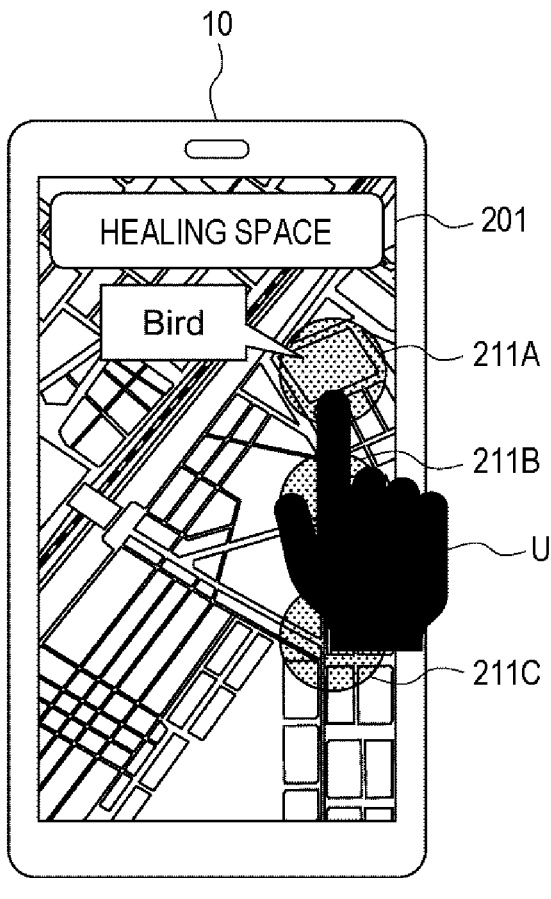
FIG. 11 is a diagram depicting a first example of a UI of an application used in setting an arrangement in a case where a spatial content is used outdoors.
Figure 12:
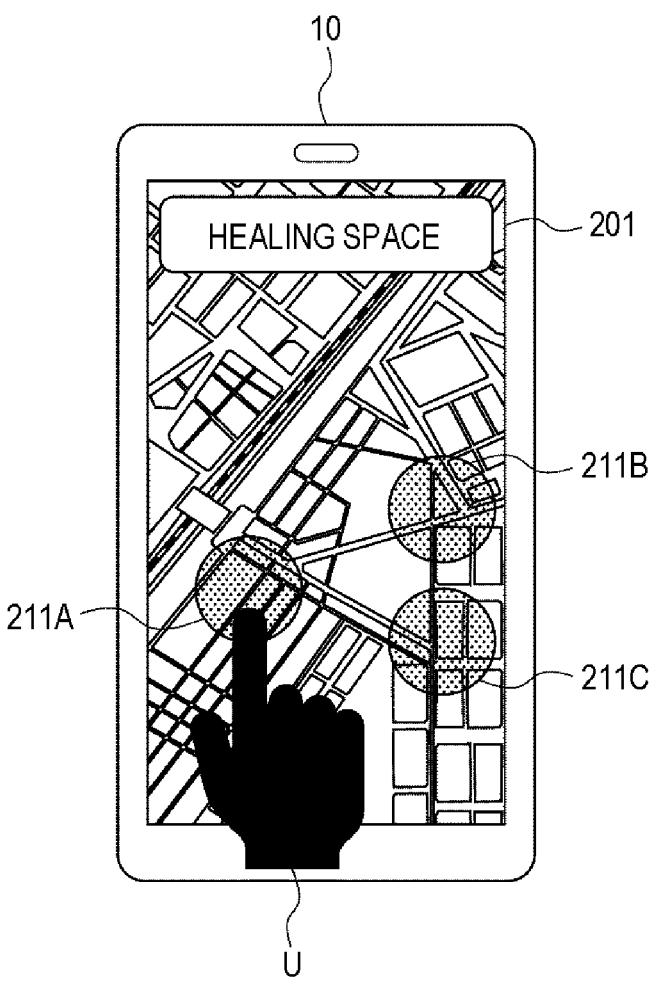
FIG. 12 is a diagram depicting a second example of the UI of the application used in setting the arrangement in a case where a spatial content is used outdoors.
Figure 13:
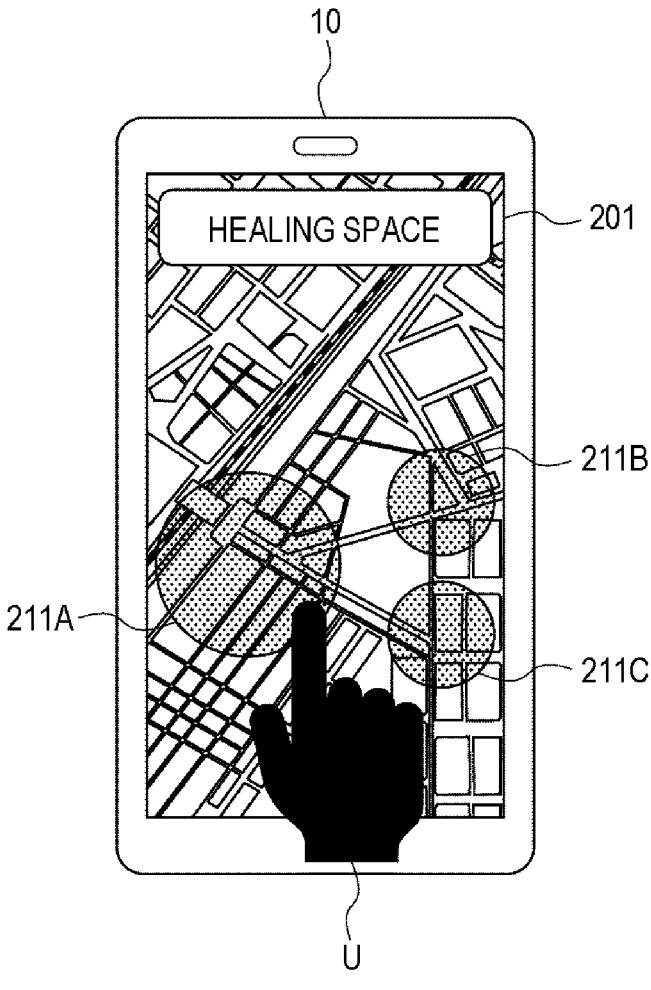
FIG. 13 is a diagram depicting a third example of the UI of the application used in setting the arrangement in a case where a spatial content is used outdoors.

FIGS. 11 to 13 depict a UI of the application used in setting the arrangement in a case where the spatial content is used outdoors.

When the map edit mode is selected, a spatial element content arrangement registration screen 201 in FIG. 11 is displayed. On the spatial element content arrangement registration screen 201, spatial element contents 211A to 211C are displayed in a superimposed manner on the map.

The spatial element content 211A is represented by a circle on the map, and the inside of the circle corresponds to the content reproduction range. That is, in the real space, when the user enters the content reproduction range indicated by the circle on the map, the device 10 reproduces the spatial element content of "Bird" as the spatial content based on the theme of "healing" and allows the user to hear a pleasant birdsong and the like.

The user can arrange the spatial element content 211A at a desired position on the map or change the content reproduction range to a desired range.

For example, a user U makes, by means of a touch panel operation using his/her finger, a drag-and-drop operation of moving the spatial element content 211A to a target place on the map while pressing the spatial element content 211A and then dropping the spatial element content 211A, thereby allowing the spatial element content 211A to be moved to the target place (FIG. 11, FIG. 12). Moreover, the user U can make a pinch-out or pinch-in operation while touching the spatial element content 211A to enlarge or reduce the content reproduction range of the spatial element content 211A (FIG. 12, FIG. 13).

As described above, in the map edit mode, the spatial element content is displayed in a predetermined shape on the map, so that the user can confirm the details of the spatial element content and move the position of the target to a place where the user wants to put the target or change the content reproduction range.

Returning to FIG. 10, in setting the arrangement in a case where the spatial content is brought indoors, the target/reproduction range setting unit 151 performs processes of steps S104-2 to S108 on the right side of FIG. 10.

That is, the list edit mode is selected (S104-2), and the spatial element content is displayed on the list (S105-2). The spatial element content is selected according to the operation made by the user on the spatial element content on the list (S106), and the arrangement of the spatial element content thus selected is registered as an image (S107-2). Information regarding the spatial content set as described above (information such as a physical object image for identifying the target, a coordinate position indicating the position of the target, and a radius indicating the content reproduction range) is stored in the storage unit 107 (S108).

Figure 14:
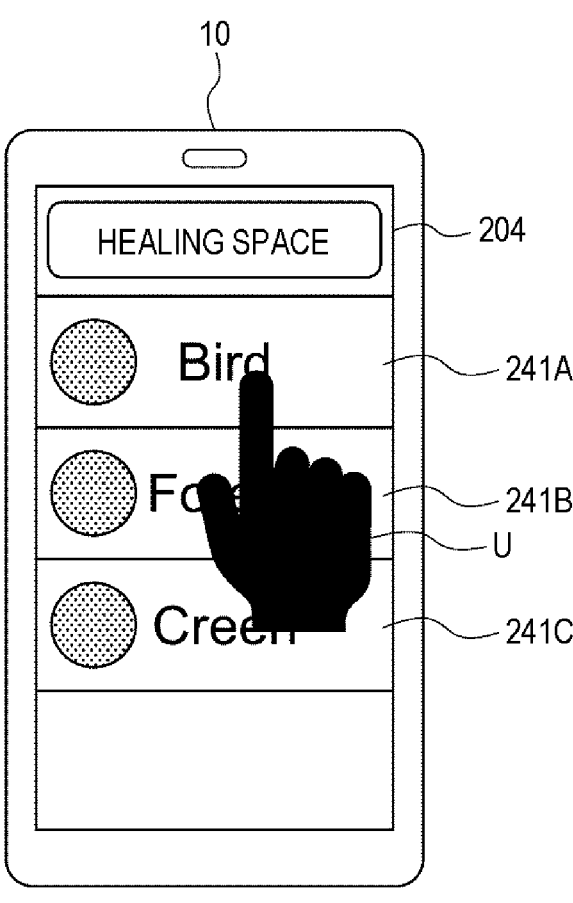
FIG. 14 is a diagram depicting a first example of a UI of the application used in setting an arrangement in a case where a spatial content is used indoors.
Figure 15:
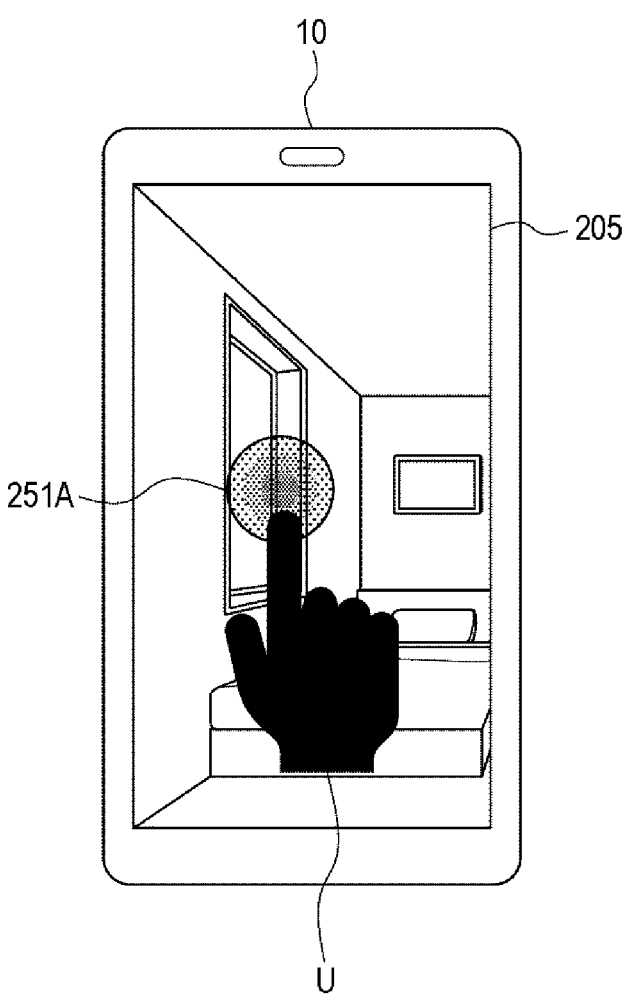
FIG. 15 is a diagram depicting a second example of the UI of the application used in setting the arrangement in a case where a spatial content is used indoors.
Figure 16:
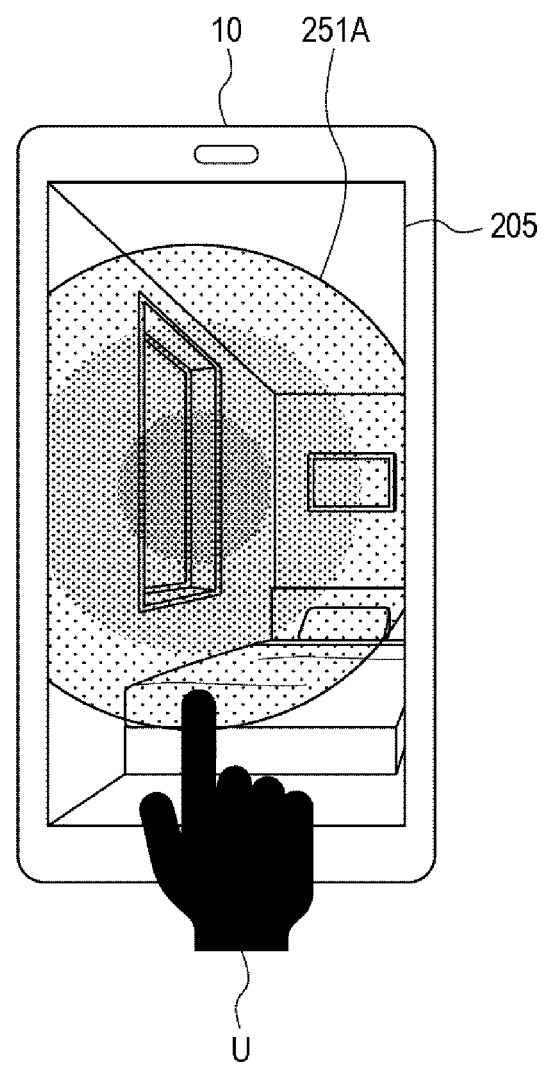
FIG. 16 is a diagram depicting a third example of the UI of the application used in setting the arrangement in a case where spatial content is used indoors.

FIGS. 14 to 16 depict a UI of the application used in setting the arrangement in a case where the spatial content is used indoors.

When the list edit mode is selected, a spatial element content list screen 204 in FIG. 14 is displayed. On the spatial element content list screen 204, list items 241A to 241C for selecting a spatial element content are displayed in list form.

The list item 241A is operated to select the spatial element content of "Bird". The list item 241B is operated to select the spatial element content of "Forest". The list item 241C is operated to select the spatial element content of "Creek".

The user can select a desired spatial element content from the list and arrange the spatial element content at a desired indoor position or change the content reproduction range to a desired range.

For example, when the user U in a room of his/her home makes, by means of a touch panel operation using his/her finger, a tap operation on the list item 241A in the list, a spatial element content 251A represented by a sphere is displayed in a superimposed manner on a captured image 205 of the room (FIG. 14, FIG. 15). The user U can make a drag-and-drop operation to move the spatial element content 251A to a desired place, or can make a pinch-out or pinch-in operation to enlarge or reduce the content reproduction range (FIG. 15, FIG. 16).

As described above, in the list edit mode, list items each associated with a corresponding spatial element content are displayed in list form, and when the user confirms the details of the list items and makes a tap operation, the camera unit 112 of the device 10 transitions to an augmented reality (AR) mode, thereby allowing the user to move the position of the target to a place where the user wants to put the target or change the content reproduction range over the screen.

The user edits the position where the spatial element content is arranged by setting the arrangements in both a case where the spatial content is used outdoors and a case where the spatial content is used indoors. In arranging the spatial element content, it is possible to arrange the spatial element content optimally adapted to the surrounding environment of the user. On the other hand, it is not necessary for the business operator or the creator belonging to the service provider to arrange the spatial element content, and it is therefore possible to save working time and effort.

Returning to FIG. 10, when the spatial content is stored in step S108, the processing proceeds to step S109. In step S109, the content reproduction unit 157 starts to reproduce the spatial content.

Figure 17:
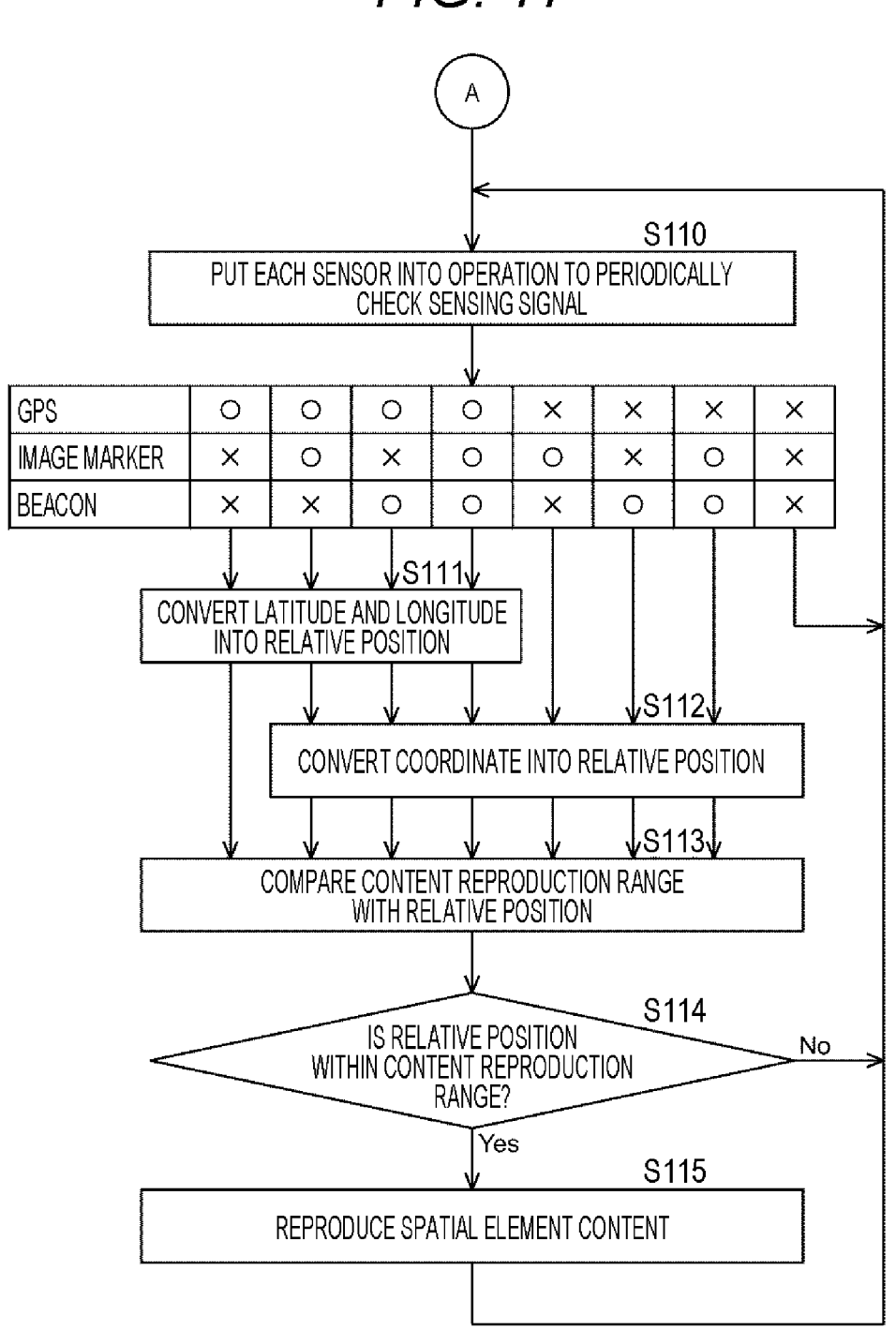
FIG. 17 is a flowchart for describing a flow of processing to be performed by the device.

When the reproduction of the spatial content is started in step S109 in FIG. 10, the processing proceeds to step S110 in FIG. 17. In step S110, the absolute position detection unit 152 and the relative position detection unit 154 each put a corresponding sensor into operation to periodically check a sensing signal.

After step S110, a flow of processing according to the sensing signal actually obtained in a case where a GPS, an image marker, and a beacon are used in concurrent sensing is depicted. Measurement using the GPS is performed when the GPS unit 114 receives a signal from a GPS satellite. Measurement using the image marker is performed when the camera unit 112 or the like captures an image of (measures) the image marker. Measurement using the beacon is performed when the near-field wireless communication unit 109 or the like receives a signal of the beacon.

That is, the method for measuring the position of the target (spatial element content reproduction position) and the position of the device 10 (position of the user) is different between the outdoors and the indoors, so that the positions are finally converted into a relative position by a method according to the type of sensing.

The first to third lines of the table shown below step S110 indicate whether or not the measurement has been performed using the GPS, whether or not the measurement has been performed using the image marker, and whether or not the measurement has been performed using the beacon, respectively, by a circle and a cross.

For example, the measurement using the GPS is performed for the outdoors, and the measurement using the image marker or the beacon is performed for the indoors. Note that the image marker or the beacon may be used for the outdoors. For example, in a case where the GPS is low in accuracy and it is desired to support "in front of a store door" or the like, the image marker can be arranged outdoors.

In a case where the measurement is performed using the GPS, the latitude and longitude of the GPS are converted into the relative position (S111). In a case where the measurement is performed using the image marker and the beacon, the coordinates of the space are converted into the relative position (S112). As a result, the relative position between the target and the device 10 is identified by the target/device relative position identification unit 155. Note that the method for identifying the relative position will be described later in detail.

When the conversion into the relative position is performed in at least one of step S111 or step S112, and the relative position between the target and the device 10 is identified, the processing proceeds to step S113. Note that, in a case where the sensing signal cannot be checked by the measurement using any one of the GPS, the image marker, or the beacon, the processing returns to step S110, and the subsequent processes are repeated.

The reproduction range/relative position comparison unit 156 compares the content reproduction range with the relative position (S113) to determine whether or not the relative position is within the content reproduction range (S114). Note that the comparison and determination method will be described later in detail.

In a case where it is determined in step S114 that the relative position is within the content reproduction range, the processing proceeds to step S115. In step S115, the content reproduction unit 157 reproduces the spatial element content.

On the other hand, in a case where it is determined in step S114 that no relative position is outside the content reproduction range, step S115 is skipped, the processing returns to step S110, and the subsequent processes are repeated.

The flow of processing performed by the device 10 has been described above. In the device 10, at least one target, and a spatial element content and a content reproduction range for each target are set, the relative position between the target and the device 10 is identified, the content reproduction range and the relative position are compared, and the spatial element content is reproduced on the basis of the comparison result.

It is therefore possible to bring, for example, the information regarding the absolute position based on the outdoor map and the information regarding the relative position based on the indoor positioning under centralized control, so that it is possible to seamlessly provide outdoor and indoor user experiences. It is therefore possible to provide a better user experience.

(Details of Method for Identifying Relative Position)

Figure 18:
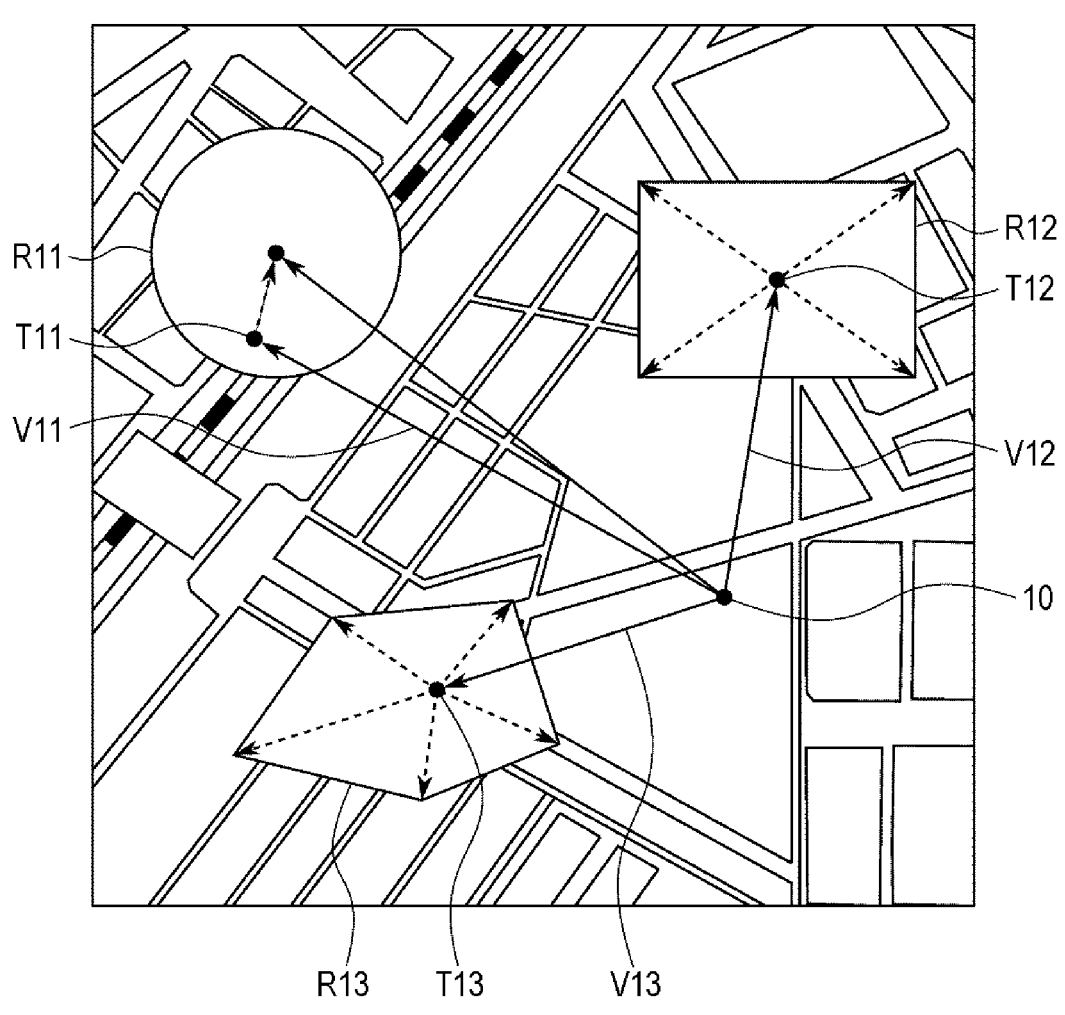
FIG. 18 is a diagram depicting a first example of a method for identifying a relative position between a target and the device.

Next, the method for identifying the relative position between the target and the device 10 will be described in detail with reference to FIGS. 18 to 24. FIG. 18 is a diagram depicting a first example of the method for identifying the relative position between the target and the device 10.

In this identification method, the relative position between the target and the device 10 is identified using the absolute position of (the content reproduction range including) the target arranged on the map and the absolute position of the device 10.

In FIG. 18, targets T11, T12, and T13 are set on a map. A content reproduction range R11 having a circular shape is set for the target T11, and a relative position between the target T11 and the device 10 can be identified on the basis of a relationship between the absolute position of the target T11 and the absolute position of the device 10 on the map. Note that FIG. 18 depicts a case where the position of the target T11 does not coincide with the center of the content reproduction range R11 having a circular shape, but the relative position can be similarly identified even in a case where the position of the target T11 coincides with the center of the content reproduction range R11.

A content reproduction range R12 having a rectangular shape is set for the target T12, and a relative position between the target T12 and the device 10 can be identified on the basis of a relationship between the absolute position of the target T12 and the absolute position of the device 10 on the map. A content reproduction range R13 having a polygonal shape is set for the target T13, and a relative position between the target T13 and the device 10 can be identified on the basis of a relationship between the absolute position of the target T13 and the absolute position of the device 10 on the map.

It is possible to use, as the map used for identifying the relative position, environmental map information generated using information regarding the surrounding environment obtained from the camera unit 112 or the sensor unit 113 using topographic map information provided by a map service, simultaneous localization and mapping (SLAM), or the like. Note that it is assumed that the GPS is used for the outdoors, but in a case where the SLAM is used, it can be used not only for the outdoors but also the indoors.

In a case where the topographic map information provided by the map service is used, the relative position between the target and the device 10 is calculated on the basis of the latitude and longitude indicating the position (current position) of the device 10 measured using the GPS and the latitude and longitude indicating the position of the target set in the map edit mode.

For example, as depicted in FIG. 19, when the latitude and longitude indicating the position of the device 10 are denoted as latitude and longitude (Lat1, Lng1), and the latitude and longitude indicating the position of the target are denoted as latitude and longitude (Lat2, Lng2), the relative position between the target and the device 10 can be represented by a vector. The vector indicating the relative position can be represented by latitude and longitude (Lat1-Lat2, Lng1-Lng2), coordinates (X1, X2), or the like. In FIG. 18, the positions of the device 10 relative to the targets T11, T12, and T13 are represented by vectors V11, V12, and V13, respectively.

In a case where the environmental map information generated using the SLAM or the like is used, the relative position between the target and the device 10 is calculated on the basis of the coordinates indicating the position (self-position) of the device 10 and the coordinates indicating the position of the target. The self-position of the device 10 can be estimated by using the SLAM or the like. Note that a known technique can be used for the generation of environmental map information and the self-position estimation using the SLAM.

For example, as depicted in FIG. 20, when the coordinates indicating the position (self-position) of the device 10 are denoted as coordinates (x1, y1) in the space, and the coordinates indicating the position of the target are denoted as coordinates (x2, y2) in the space, the relative position between the target and the device 10 can be represented by a vector. The vector indicating the relative position can be represented by coordinates (x1-x2, y1-y2), coordinates (X1, X2), or the like.

As described above, in a case where it is possible to designate a position using outdoor and indoor maps created in advance, it is possible to perform, by controlling the position that can be designated as the relative position, the spatial element content reproduction control with the same configuration even in a case where a different position detection method is used.

Figure 21:
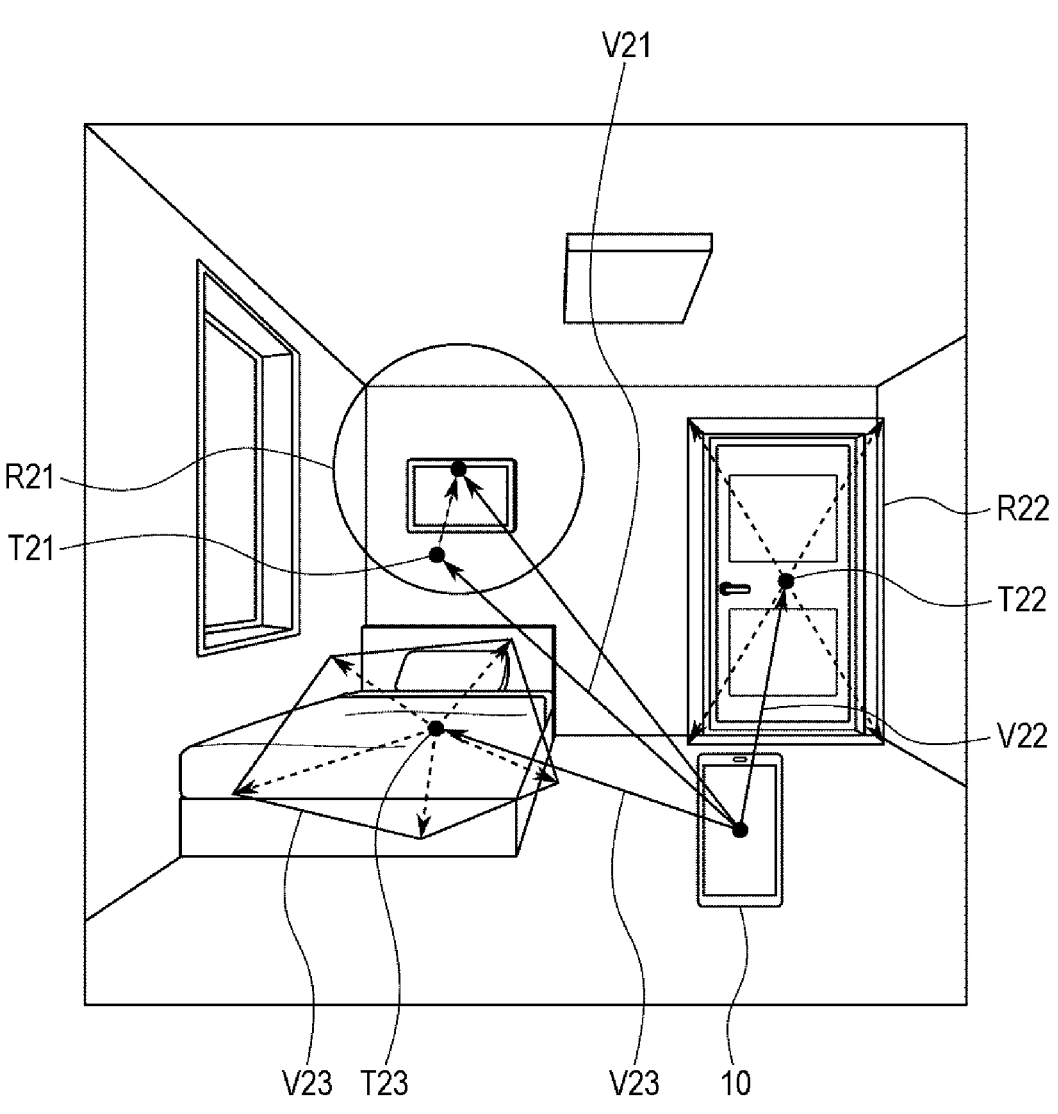
FIG. 21 is a diagram depicting a second example of the method for identifying the relative position between the target and the device.

FIG. 21 is a diagram depicting a second example of the method for identifying the relative position between the target and the device 10.

In this identification method, the relative position (relative distance and direction) between the target and the device 10 is identified using any target object (physical object or the like) associated with the target. The target and any target object (physical object or the like) are associated in advance with each other on the basis of the target information.

In FIG. 21, targets T21, T22, and T23 are each associated with any physical object arranged in a room of the user's home or the like.

The target T21 is associated with a painting on a wall in advance by the user, and a content reproduction range R21 having a spherical shape is set. The target T22 is associated with a door in advance by the user, and a content reproduction range R22 having a rectangular cuboid shape is set. The target T23 is associated with a bed in advance by the user, and a content reproduction range R23 having a polyhedral shape is set.

In the device 10, the camera unit 112 transitions to the AR mode and captures an image (performs measurement) using the image of the physical object associated with the target in advance by the user as the image marker (AR marker), thereby allowing a vector indicating the relative position between the target and the device 10 to be calculated. Note that a known technique can be used for the position measurement using the image marker.

Figures 22, 23:
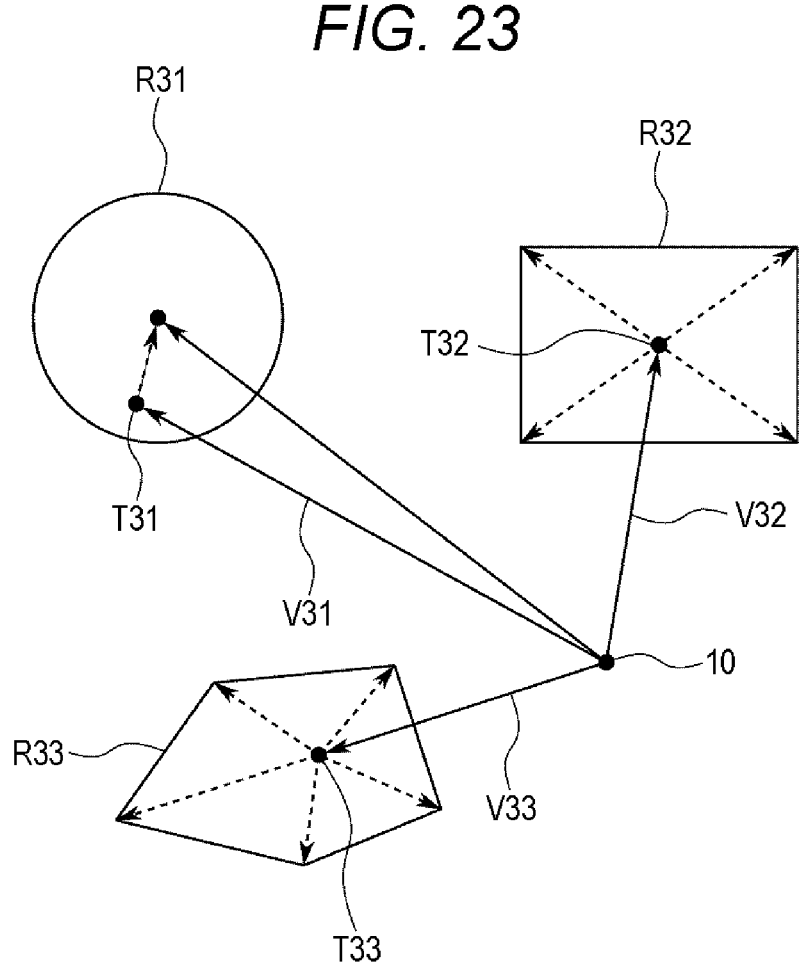
FIG. 22 is a diagram depicting an example of a case where a vector indicating the relative position is calculated using a physical object associated with the target.
FIG. 23 is a diagram depicting a third example of the method for identifying the relative position between the target and the device.

For example, as depicted in FIG. 22, when the coordinates indicating the position of the device 10 are denoted as coordinates (x1, y1), and the coordinates indicating the position of the target are denoted as coordinates (x2, y2), the relative position between the target and the device 10 can be represented by a vector. The vector indicating the relative position can be represented by coordinates (X1, X2) or the like. In FIG. 21, the positions of the device 10 relative to the targets T21, T22, and T23 are represented by vectors V21, V22, and V23, respectively.

As described above, even in an indoor space such as a home for which there is no map created in advance, the target is arranged by means of the target object such as a physical object, and control based on the position relative to the target object is performed, so that it is possible to perform the spatial element content reproduction control with the same configuration as in a case where there is a map created in advance.

FIG. 23 is a diagram depicting a third example of the method for identifying the relative position between the target and the device 10.

In this identification method, a physical object including a signal transmission unit is used as any target object (physical object or the like) associated with the target, and the relative position between the target and the device 10 is identified on the basis of a signal transmitted from the signal transmission unit. For example, a measurement function using various beacons such as a Bluetooth (BT) beacon and a light emitting diode (LED) beacon can be used as the signal transmission unit included in the physical object.

In FIG. 23, targets T31, T32, and T33 are each associated in advance with a physical object arranged in a room of the user's home or the like.

The target T31 is associated with a physical object including a signal transmission unit such as a beacon, and a content reproduction range R31 having a spherical shape is set. The target T32 is associated with a physical object including a signal transmission unit such as a beacon, and a content reproduction range R32 having a rectangular cuboid shape is set. The target T33 is associated with a physical object including a signal transmission unit such as a beacon, and a content reproduction range R33 having a polyhedral shape is set.

In the device 10, a signal transmitted from the signal transmission unit included in the physical object is received by the near-field wireless communication unit 109 or the like, and a vector indicating the relative position between the target and the device 10 can be calculated on the basis of the received signal. Note that a known technique can be used for the position measurement using a beacon.

Figures 24, 25:
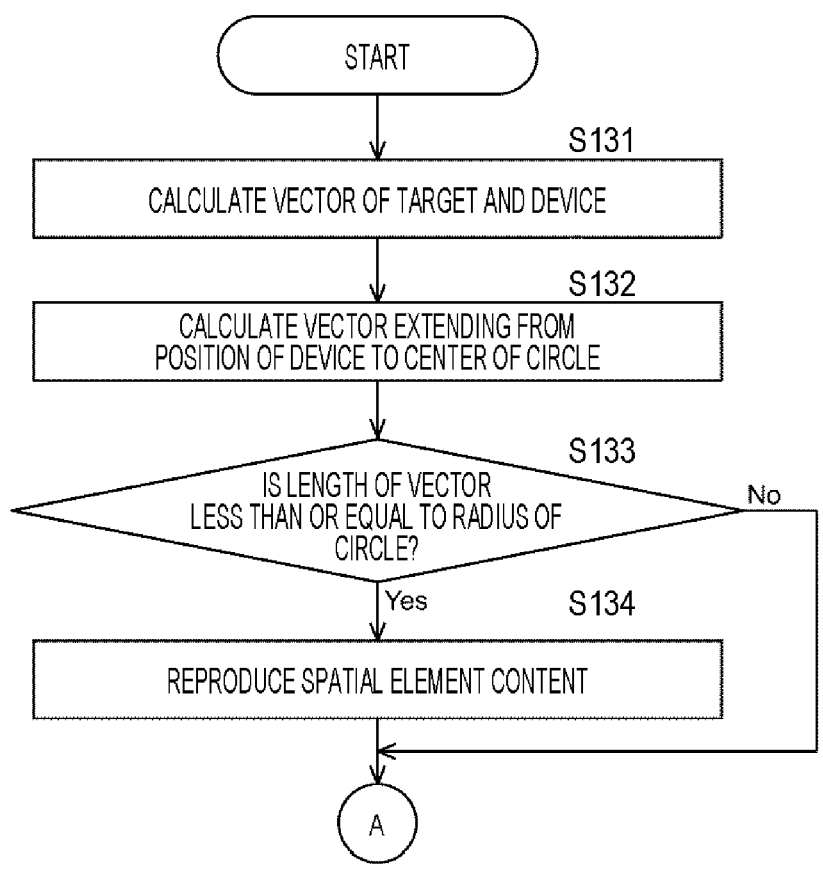
FIG. 24 is a diagram depicting an example of a case where a vector indicating the relative position is calculated using, as the physical object associated with the target, a physical object including a signal transmission unit.
FIG. 25 is a flowchart for describing a flow of comparison and determination processing on a content reproduction range and the relative position.

For example, as depicted in FIG. 24, when the coordinates indicating the position of the device 10 are denoted as coordinates (x1, y1), and the coordinates indicating the position of the target are denoted as coordinates (x2, y2), the relative position between the target and the device 10 can be represented by a vector. The vector indicating the relative position can be represented by coordinates (X1, X2) or the like. In FIG. 23, the positions of the device 10 relative to the targets T31, T32, and T33 are represented by vectors V31, V32, and V33, respectively.

As described above, even in an indoor space such as a home for which there is no map created in advance, the target is arranged by means of the target object such as a physical object including a signal transmission unit, and control based on the position relative to the target object such as the physical object including a signal transmission unit is performed, so that it is possible to perform the spatial element content reproduction control with the same configuration as in a case where there is a map created in advance.

(Details of Comparison and Determination Method) Next, the method for comparing, for determination, the content reproduction range and the relative position will be described in detail with reference to FIGS. 25, 26, 27A, 27B, 27C, and 28. First, with reference to the flowchart in FIG. 25, a flow of comparison and determination processing on the content reproduction range and the relative position will be described.

This comparison and determination processing corresponds to the processes of steps S111 to S114 in FIG. 17, which shows the details of the processing. Note that when this comparison and determination processing is performed, it is assumed that a content reproduction range having a circular shape is set in advance for the target.

In step S131, the target/device relative position identification unit 155 calculates a vector indicating the relative position between the target and the device 10.

In step S132, the target/device relative position identification unit 155 calculates a vector extending from the position of the device 10 to the center of the circle that is the shape of the content reproduction range.

In step S133, the reproduction range/relative position comparison unit 156 determines whether or not the length of the vector calculated in the process of step S132 is less than or equal to the radius of the circle that is the shape of the content reproduction range.

In a case where it is determined in step S133 that the length of the vector is less than or equal to the radius of the circle, the relative position is within the content reproduction range, so that the processing proceeds to step S134. In step S134, the content reproduction unit 157 reproduces the spatial element content corresponding to the target.

On the other hand, in a case where it is determined in step S133 that the length of the vector is greater than the radius of the circle, the relative position is outside the content reproduction range, so that the process of step S134 is skipped. Thereafter, the processing returns to step S110 in FIG. 17, and the subsequent processes are repeated.

Note that, in the above-described example, in a case where the content reproduction range has a circular shape, it is determined whether or not the length of the vector is greater than the radius of the circle; on the other hand, in a case where the content reproduction range has a spherical shape, it is only required to determine whether or not the length of the vector is greater than the radius of the sphere.

In the flowchart in FIG. 25, the case where the content reproduction range has a circular shape or a spherical shape has been described, but the content reproduction range may have not only a circular shape, but also a rectangular shape, a polygonal shape, a spherical shape, a polyhedral shape (a cube, a rectangular cuboid, or the like), or the like. Next, a case where a content reproduction range having a rectangular or polygonal shape is set in advance for the target when the comparison and determination processing is performed will be described with reference to the flowchart in FIG. 26.

In step S151, the target/device relative position identification unit 155 calculates a vector indicating the relative position between the target and the device 10.

In step S152, the reproduction range/relative position comparison unit 156 determines whether or not the vector calculated in the process of step S151 is within a triangle including the target. Although the details will be described with reference to FIGS. 27A, 27B, 27C, and 28, the triangle including the target is a triangle formed by connecting two adjacent vertices of the content reproduction range having a rectangular or polygonal shape and the position of the target.

In a case where it is determined in step S152 that the vector is within the triangle including the target, the relative position is within the content reproduction range, so that the processing proceeds to step S153. In step S153, the content reproduction unit 157 reproduces the spatial element content corresponding to the target.

On the other hand, in a case where it is determined in step S152 that the vector is outside the triangle including the target, the relative position is outside the content reproduction range, so that the process of step S153 is skipped. Thereafter, the processing returns to step S110 in FIG. 17, and the subsequent processes are repeated.

Figure 26:
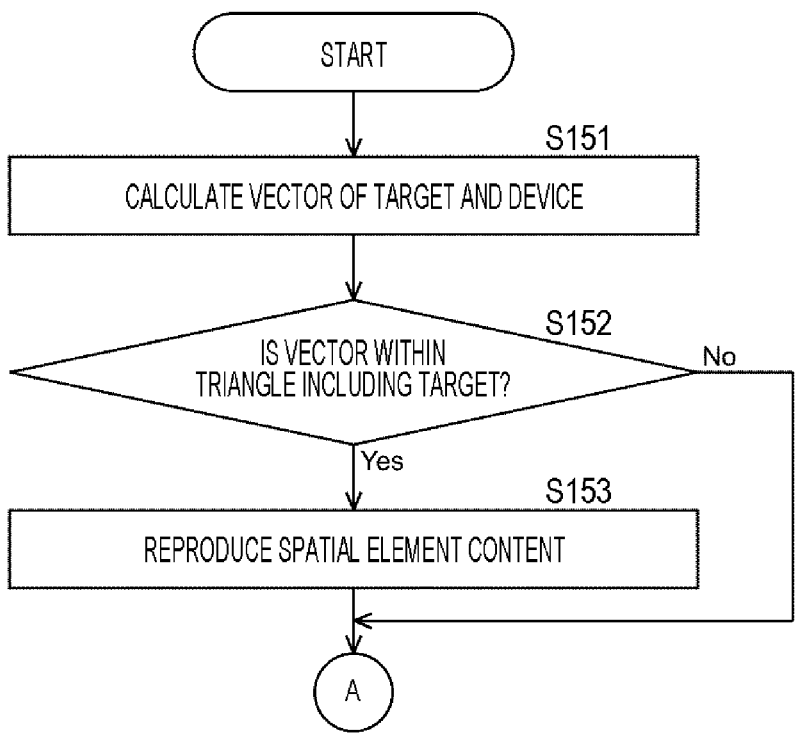
FIG. 26 is a flowchart for describing a flow of comparison and determination processing on the content reproduction range and the relative position.

Note that, in the above-described example, in a case where the content reproduction range has a rectangular or polygonal shape, it is determined whether or not the vector is within in the triangle including the target; on the other hand, in a case where the content reproduction range is a polyhedral shape, it is only required to determine whether or not the vector is within a triangular pyramid including the target. Furthermore, the comparison and determination processing described with reference to the flowcharts in FIGS. 25 and 26 is merely an example, and other comparison and determination methods may be used.

FIGS. 27A, 27B, and 27C are diagrams depicting an example of a case where the device 10 is within the content reproduction range.

In FIG. 27A, a content reproduction range R1 having a circular shape is set for a target T1. At this time, a relationship between the position of the target T1 and a center C1 of the circle is defined in advance by a vector Va indicated by a dashed arrow in the drawing. It is possible to determine, by comparing a vector V1 connecting the position of device 10 and the position of target T1 with the vector Va connecting the position of target T1 and the center C1 of the content reproduction range R1, whether or not the position of device 10 is within the content reproduction range R1. It is determined that, by using this comparison and determination method, the relative position is within the content reproduction range R1 in the state depicted in FIG. 27A.

In FIG. 27B, a content reproduction range R2 having a rectangular shape is set for a target T2. At this time, a relationship between the position of the target T2 and four vertices D2 of the rectangle is defined in advance by four vectors Vb each indicated by a dashed arrow in the drawing. It is possible to determine, by comparing a vector V2 connecting the position of device 10 and the position of target T2 with the vector Vb connecting the position of target T2 and each vertex D2 of the content reproduction range R2, whether or not the position of device 10 is within the content reproduction range R2. It is determined that, by using this comparison and determination method, the relative position is within the content reproduction range R2 in the state depicted in FIG. 27B.

In FIG. 27C, a content reproduction range R3 having a polygonal (pentagonal) shape is set for a target T3. At this time, a relationship between the position of the target T3 and five vertices D3 of the pentagon is defined in advance by five vectors Vc each indicated by a dashed arrow in the drawing. It is possible to determine, by comparing a vector V3 connecting the position of device 10 and the position of target T3 with the vector Vc connecting the position of target T3 and each vertex D3 of the content reproduction range R3, whether or not the position of device 10 is within the content reproduction range R3. It is determined that, by using this comparison and determination method, the relative position is within the content reproduction range R3 in the state depicted in FIG. 27C.

Figure 28:
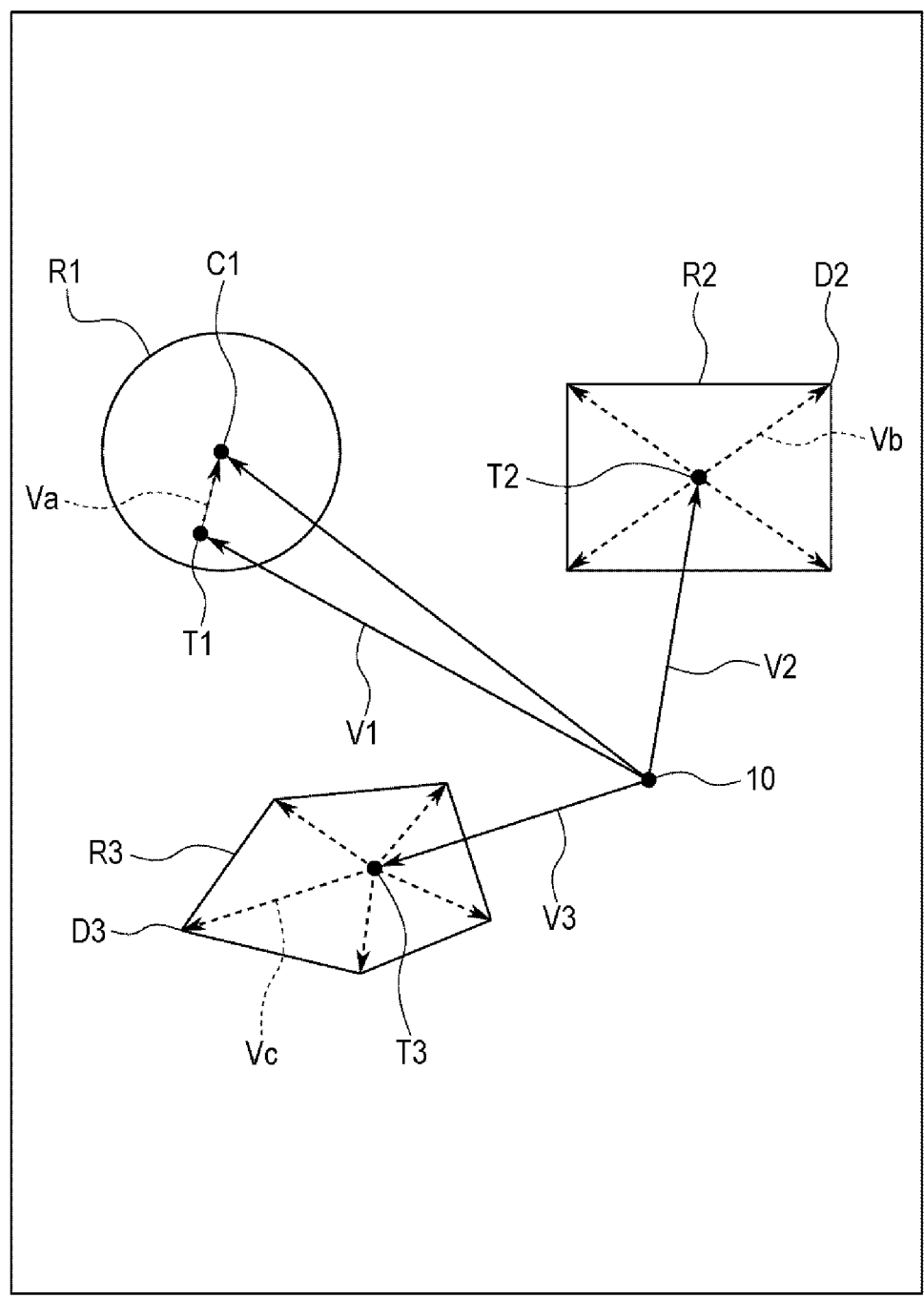
FIG. 28 is a diagram depicting an example of a case where the device is outside the content reproduction range.

FIG. 28 is a diagram depicting an example of a case where the device 10 is outside the content reproduction range.

FIG. 28 is different in the relative position between the target T1 and the device 10 from FIG. 27A. In FIG. 28, it is determined that the relative position is outside the content reproduction range R1 from the relationship between the vector V1 connecting the position of the device 10 and the position of the target T1 and the vector Va connecting the position of the target T1 and the center C1 of the content reproduction range R1.

FIG. 28 is different in the relative position between the target T2 and the device 10 from FIG. 27B. In FIG. 28, it is determined that the relative position is outside the content reproduction range R2 by comparing the vector V2 connecting the position of the device 10 and the position of the target T2 with the vector Vb connecting the position of the target T2 and each vertex D2 of the content reproduction range R2.

FIG. 28 is different in the relative position between the target T3 and the device 10 from FIG. 27C. In FIG. 28, it is determined that the relative position is outside the content reproduction range R3 by comparing the vector V3 connecting the position of the device 10 and the position of the target T3 with the vector Vb connecting the position of the target T3 and each vertex D3 of the content reproduction range R3.

Note that, although the description is not given to avoid repetition, the comparison and determination can be performed in a similar manner even in a case of a sphere or a polyhedron.

As described above, the content reproduction range is compared with the relative position between the target and the device, and the spatial element content reproduction is controlled in accordance with whether or not the relative position is within the content reproduction range. The relative position between the target and the device is used as a determination criterion, so that the spatial element content reproduction can be controlled with the same configuration for both the outdoors and the indoors.

For example, the spatial content of "healing" can be managed in the same manner regardless of whether or not it is used outdoors or indoors, and if a vector indicating the relative position between the set target and the device 10 is detected to be within the content reproduction range, the spatial content is reproduced regardless of whether or not it is arranged outdoors or indoors. Note that, in a case where there is a request from the creator who has created spatial contents that the spatial contents be used only indoors, or the like, it is possible to limit the use of the spatial contents with the wording "for indoor use" or the like.

(Use of Registered Item)

For items such as a doll (figure) of an animation or comic character, a poster, and a mug, the business operator may register information such as an image or model data as target information in advance and then sell the items. That is, the target is associated with an item such as a character doll in advance, and the user can use the spatial content by purchasing the item and putting the item at a desired place.

Figure 29:
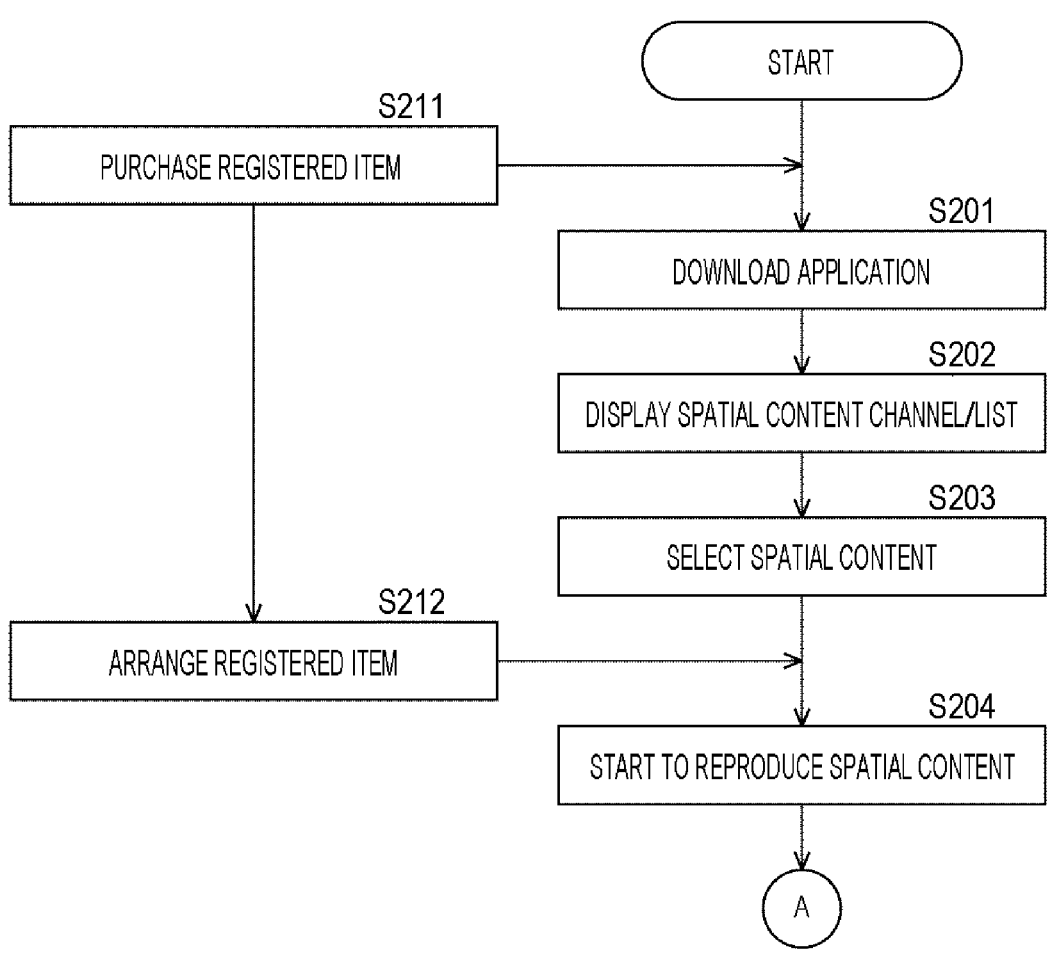
FIG. 29 is a flowchart for describing a flow of processing to be performed by the device.

With reference to the flowchart in FIG. 29, a flow of processing in a case where an item whose target information has been already registered is used will be described.

The user purchases the item whose target information has been already registered, using a store or electronic commerce (EC) (S211). When the device 10 is operated by the user who has obtained the item, the processes of steps S201 to S203 are performed.

In steps S201 to S203, in a manner similar to steps S101 to S103 in FIG. 10, the application is downloaded by the device 10, and a spatial content according to the operation made by the user is selected from the displayed channel/list.

Figure 30:
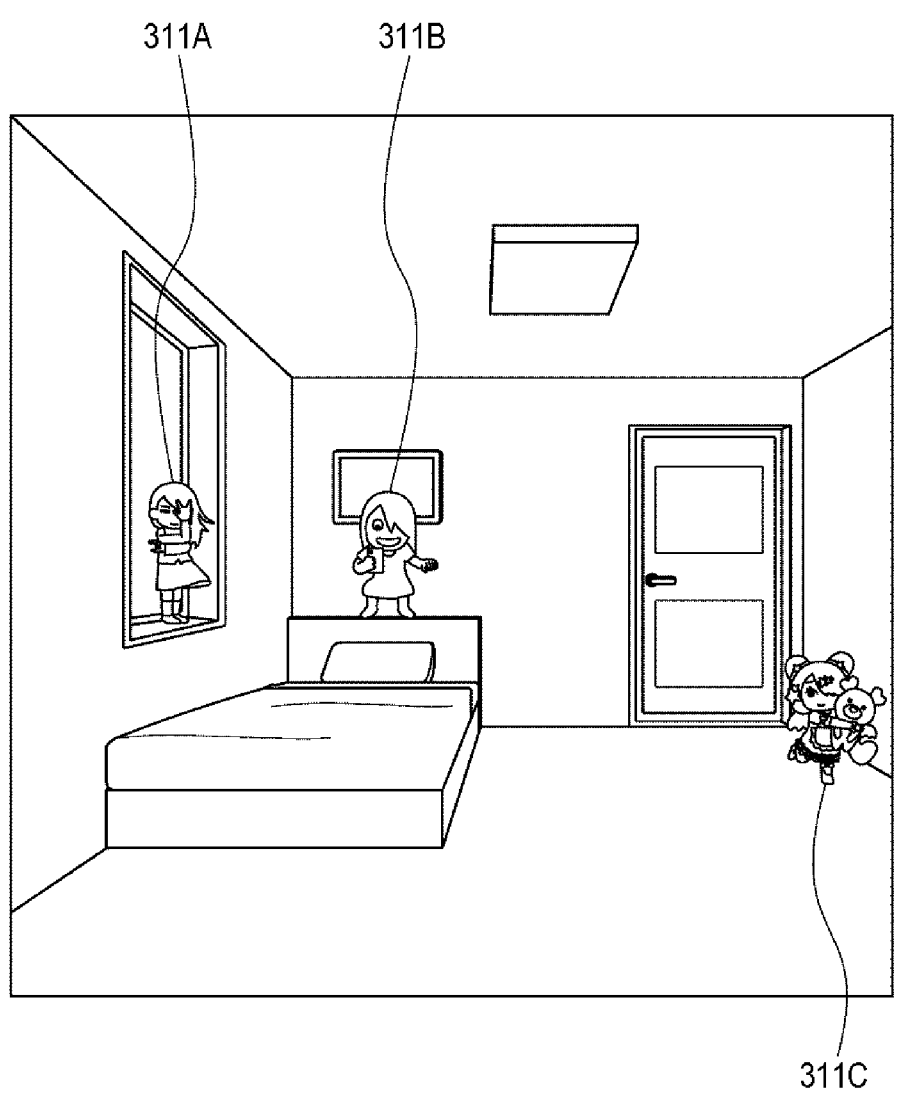
FIG. 30 is a diagram depicting an example of where registered items are arranged indoors.

The user arranges the obtained product at a desired place such as his/her room (S212). FIG. 30 is a diagram depicting an example of where registered items are arranged indoors. In FIG. 30, three items 311A to 311C purchased by the user are placed in the room. Target information regarding each of the items 311A to 311C has been already registered by the business operator.

In step S204, in a manner similar to step S109 in FIG. 10, the device 10 starts to reproduce the spatial content. As described above, in a case where the item whose target information has been already registered is used, the user need not perform registration work (the processes of steps S104-1 to S108 on the left side of FIG. 10 and the processes of steps S104-2 to S108 on the right side of FIG. 10) regarding the spatial element content arrangement. It is therefore possible to eliminate the need of the registration work regarding the spatial element content arrangement and reduce the user's effort.

Figures 31, 32:
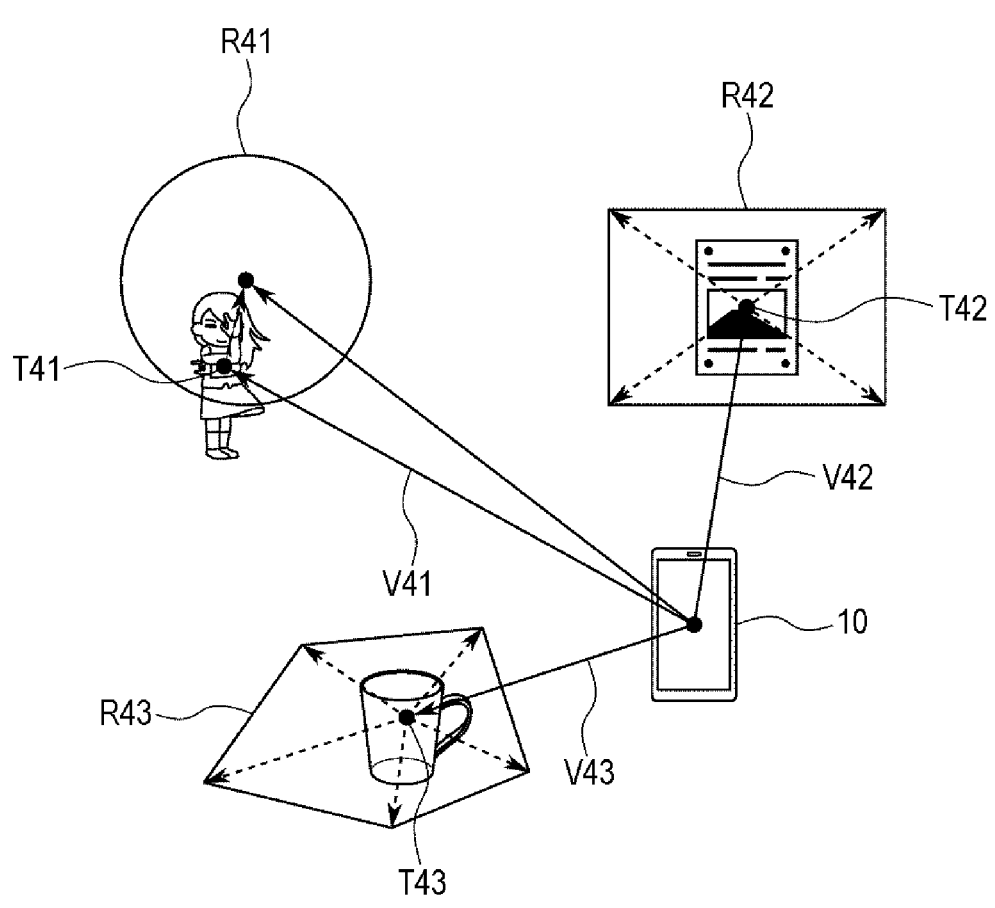
FIG. 31 is a diagram depicting a fourth example of the method for identifying the relative position between the target and the device.
FIG. 32 is a diagram depicting an example of a case where a vector indicating the relative position is calculated using a physical object associated with the target in advance.

The processes after step S204 are omitted because they are similar to the processes depicted in the flowchart in FIG. 17, but the following method can be used as the method for identifying the relative position between the target and the device 10, for example. FIG. 31 is a diagram depicting a fourth example of the method for identifying the relative position between the target and the device 10.

In this identification method, the relative position (relative distance and direction) between the target and the device 10 is identified using a product associated with the target (an item whose target information has been already registered in advance).

In FIG. 31, three products purchased and arranged in his/her room by the user are each associated with a corresponding one of targets T41, T42, and T43.

The target T41 is associated with a doll purchased and arranged by the user, and a content reproduction range R41 having a spherical shape is set. The target T42 is associated with a poster purchased and arranged by the user, and a content reproduction range R42 having a rectangular cuboid shape is set. The target T43 is associated with a mug purchased and arranged by the user, and a content reproduction range R43 having a polyhedral shape is set.

In the device 10, the camera unit 112 transitions to the AR mode and captures an image (performs measurement) using the image of the product such as a doll, a poster, or a mug associated with the target in advance by the business operator as the image marker (AR marker), thereby allowing a vector indicating the relative distance between the target and the device 10 to be calculated.

For example, as depicted in FIG. 32, when the coordinates indicating the position of the device 10 are denoted as coordinates (x1, y1), and the coordinates indicating the position of the target are denoted as coordinates (x2, y2), the relative position between the target and the device 10 can be represented by a vector. The vector indicating the relative position can be represented by coordinates (X1, X2) or the like. In FIG. 31, the positions of the device 10 relative to the targets T41, T42, and T43 are represented by vectors V41, V42, and V43, respectively.

As described above, even in an indoor space such as a home for which there is no map created in advance, the target is arranged by means of a product sold by the business operator (item whose target information has been already registered in advance), and control based on the position relative to the product is performed, so that it is possible to perform the spatial element content reproduction control with the same configuration as in a case where there is a map created in advance.

Note that, in the above description, the case where the item whose target information has been already registered in advance is sold as a product has been described; however, the item is not limited to the one purchased by the user, and may be distributed for free to a user who has participated in an event, for example.

(Automatic Target Arrangement)

It is possible to provide various kinds of contents as the spatial contents or the spatial element contents, so that there is a limit on the number of contents that can be registered by the user. On the other hand, there may be some contents whose arrangement is predetermined by the creator. It is therefore required to automatically arrange the contents without losing an arrangement relationship between the contents predetermined by the creator.

Figure 33:
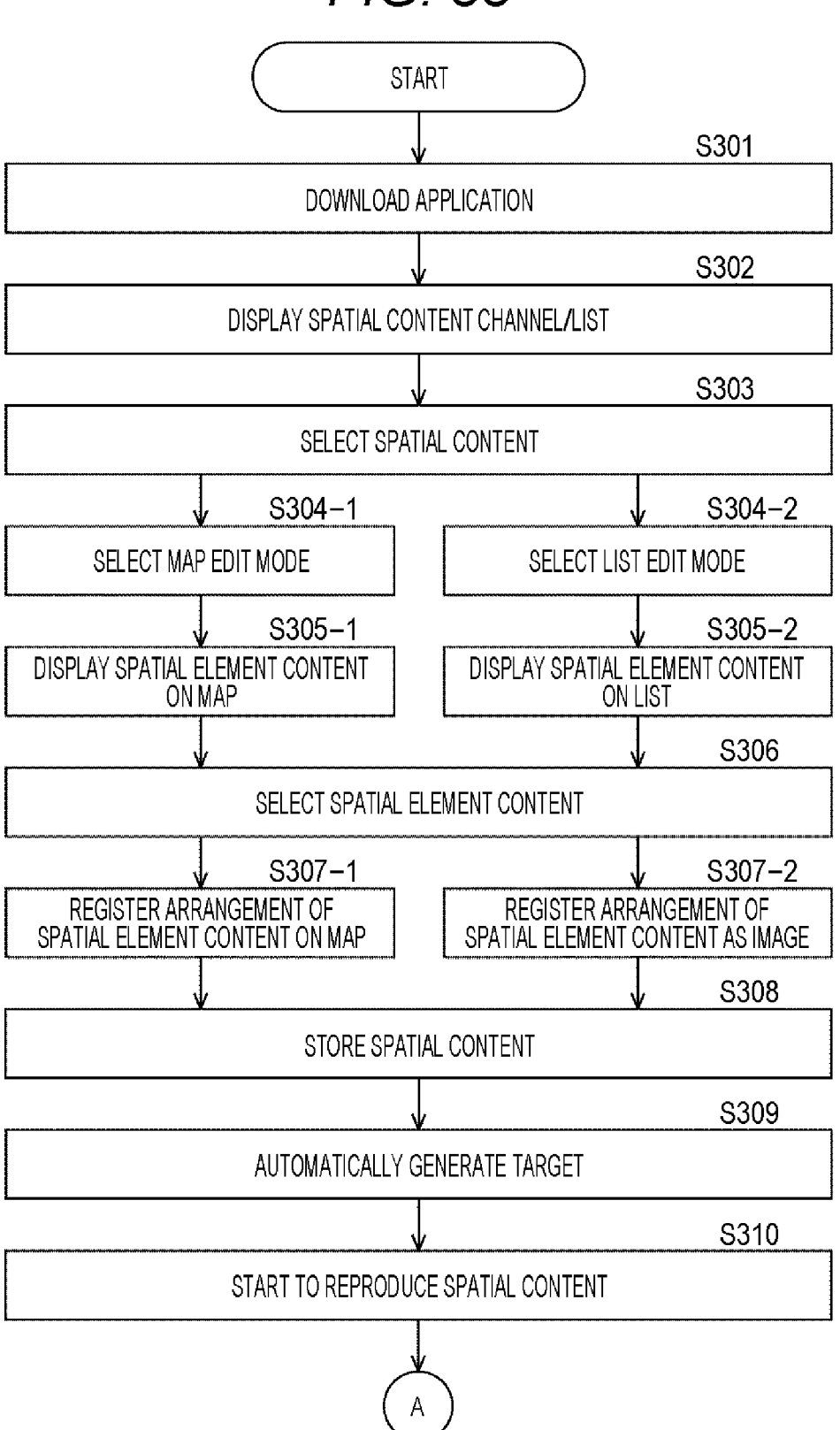
FIG. 33 is a flowchart for describing a flow of processing to be performed by the device.

A flow of processing in a case where the target is automatically arranged will be described with reference to the flowchart in FIG. 33. Note that the processes after step S310 in FIG. 33 are depicted in the flowchart in FIG. 17.

In steps S301 to S308, in a manner similar to steps S101 to S108 in FIG. 10, the device 10 downloads the application, selects the spatial content according to the operation made by the user, performs registration processing regarding the spatial element content arrangement, and stores the spatial content. When the process of step S308 is finished, the processing proceeds to step S309.

In step S309, the target/reproduction range setting unit 151 automatically generates a target. When the target is automatically generated, it is required that the target be arranged without losing the arrangement relationship between contents predetermined by the creator, but the target can be arranged by a method as depicted in FIGS. 34 to 37, for example.

Figure 34:
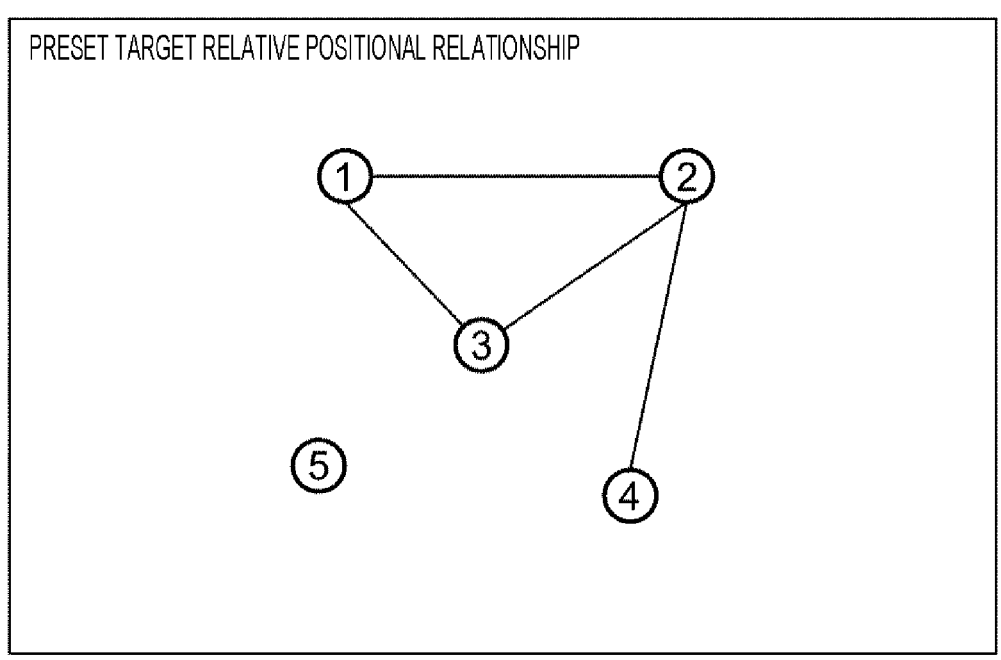
FIG. 34 is a diagram depicting a first example of an automatic target arrangement.
Figure 35:
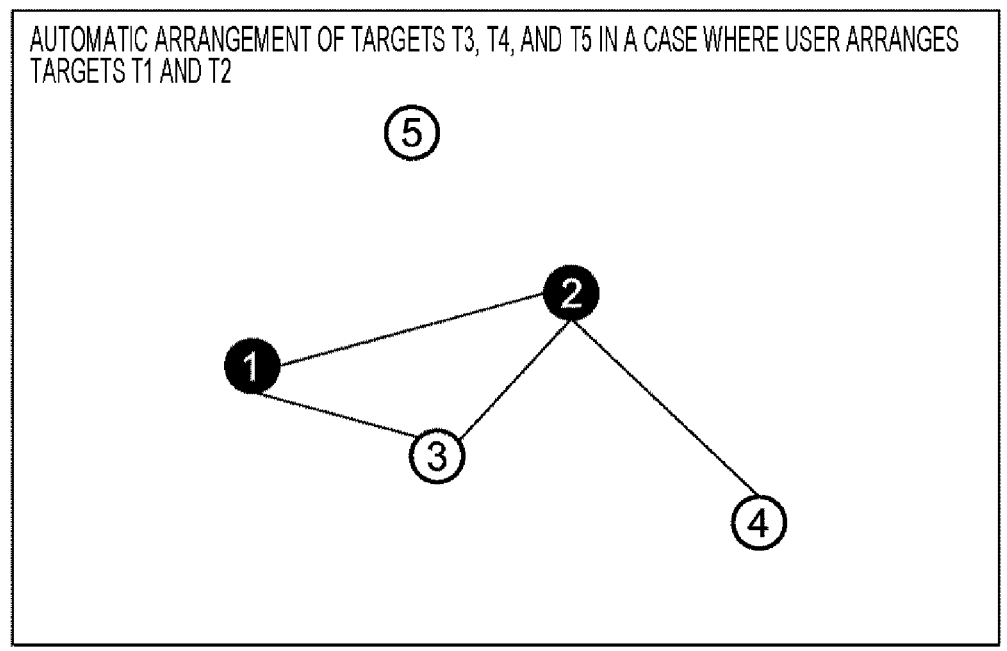
FIG. 35 is a diagram depicting the first example of the automatic target arrangement.

FIGS. 34 to 36 are diagrams depicting a first example of the automatic target arrangement.

In FIG. 34, five targets T1 to T5 each represented by a numbered circle are arranged. FIG. 34 depicts that a relative positional relationship is set in advance for the four targets T1 to T4 connected by solid lines. No relative positional relationship between the target T5 and another target is set.

At this time, as depicted in FIG. 35, it is assumed that the targets T1 and T2 are arranged by the user. Although the relative positional relationship is set for the targets T1 to T4, attention is paid to the target T3 that is automatically arranged on the basis of the position relative to the targets T1 and T2.

As depicted in FIG. 36, as a condition for arranging the target T3, an area satisfying the following conditions (a) and (b) can be set as an area where the target T3 can be arranged.

(a) It is within a fan-shaped area having a radius of 0.8 times a distance from the target T1 to the target T2 and a central angle of 60° based on the position of the target T1.

(b) It is within a fan-shaped area having a radius of 0.8 times a distance from the target T2 to the target T1 and a central angle of 60° based on the position of the target T2.

That is, as depicted in FIG. 36, the target T3 can be automatically arranged in an area (hatched area in the drawing) where the fan-shaped area based on the position of the target T1 and the fan-shaped area based on the position of the target T2 are superimposed. In other words, the relative positional relationship includes at least information regarding the distance and the angle between one target (T1 or T2) as a reference and the other target (T2 or T1).

As the method for identifying the absolute positions of the targets T1 and T2 arranged by the user, for example, a method for arranging the target and the content reproduction range on a map, a method for measuring the distance and direction between the target object associated with the target in advance and the device 10, or the like can be used.

Note that the target T4 can be automatically arranged on the basis of the position relative to the target T2. No relative positional relationship between the target T5 and another target is set, so that the target T5 is automatically arranged regardless of the targets T1 and T2.

As described above, the target that is not arranged by the user is automatically arranged using the relative positional relationship between the targets set in advance, so that it is possible to automatically arrange the target according to the arrangement made by the user without losing the arrangement relationship between the targets predetermined by the creator.

Figure 37:
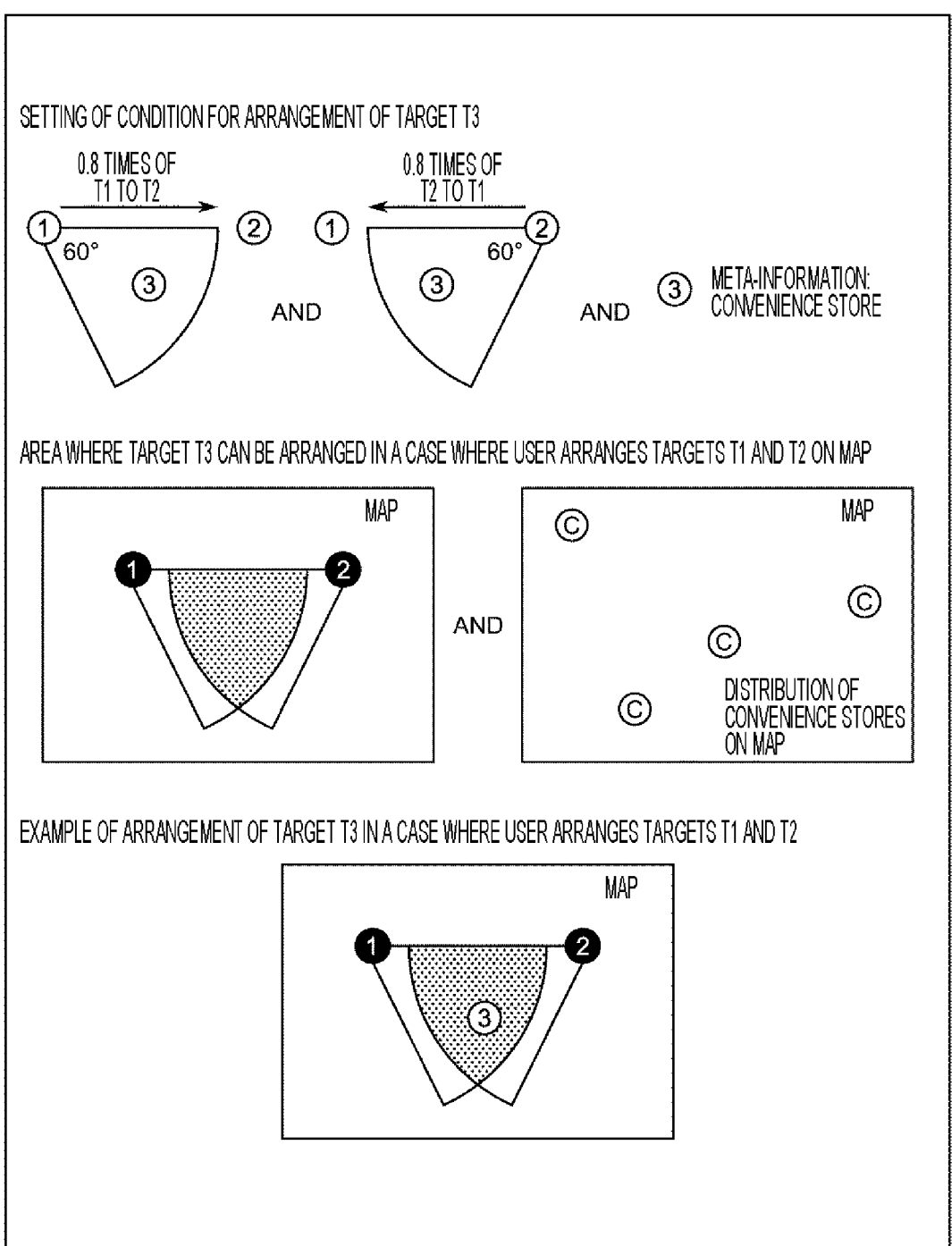
FIG. 37 is a diagram depicting a second example of the automatic target arrangement.

FIG. 37 is a diagram depicting a second example of the automatic target arrangement.

FIG. 37 is different from the first example depicted in FIGS. 34 to 36 in that meta-information is additionally used as a condition for arranging the target T3. That is, in the second example, the following condition (c) is added to the above-described conditions (a) and (b).

(a) It is within a fan-shaped area having a radius of 0.8 times a distance from the target T1 to the target T2 and a central angle of 60° based on the position of the target T1.

(b) It is within a fan-shaped area having a radius of 0.8 times a distance from the target T2 to the target T1 and a central angle of 60° based on the position of the target T2.

(c) The target T3 is a "convenience store".

That is, as depicted in FIG. 37, the target T3 can be arranged in an area (hatched area in the drawing) on the map where a fan-shaped area based on the position of the target T1 arranged on the map and a fan-shaped area based on the position of the target T2 arranged on the map are superimposed, but it is required that the target T3 be a "convenience store". Here, the use of distribution of convenience stores on the map where the target T1 and the target T2 are arranged allows a convenience store present in the hatched area in the drawing to be set as the target T3. Here, the meta-information regarding the target to be automatically arranged is compared with the meta-information on the map while maintaining the relative positional relationship between the targets set in advance.

As described above, the target that is not arranged by the user is automatically arranged using the relative positional relationship between the targets set in advance and the meta-information, so that it is possible to automatically arrange the target according to the arrangement made by the user without losing the arrangement relationship between the targets predetermined by the creator and in a manner adapted to the real environment.

Note that geographic data (natural environment, facility, scenery, and the like), environmental data (weather, time zone, and the like), and the like can be used as the meta-information. Furthermore, machine learning using data such as geographic data or environmental data highly relevant to the spatial content or the spatial element content as training data may be performed, and the meta-information may be provided using a learned model.

2. Modification Example (Content Sharing)

Figure 38:
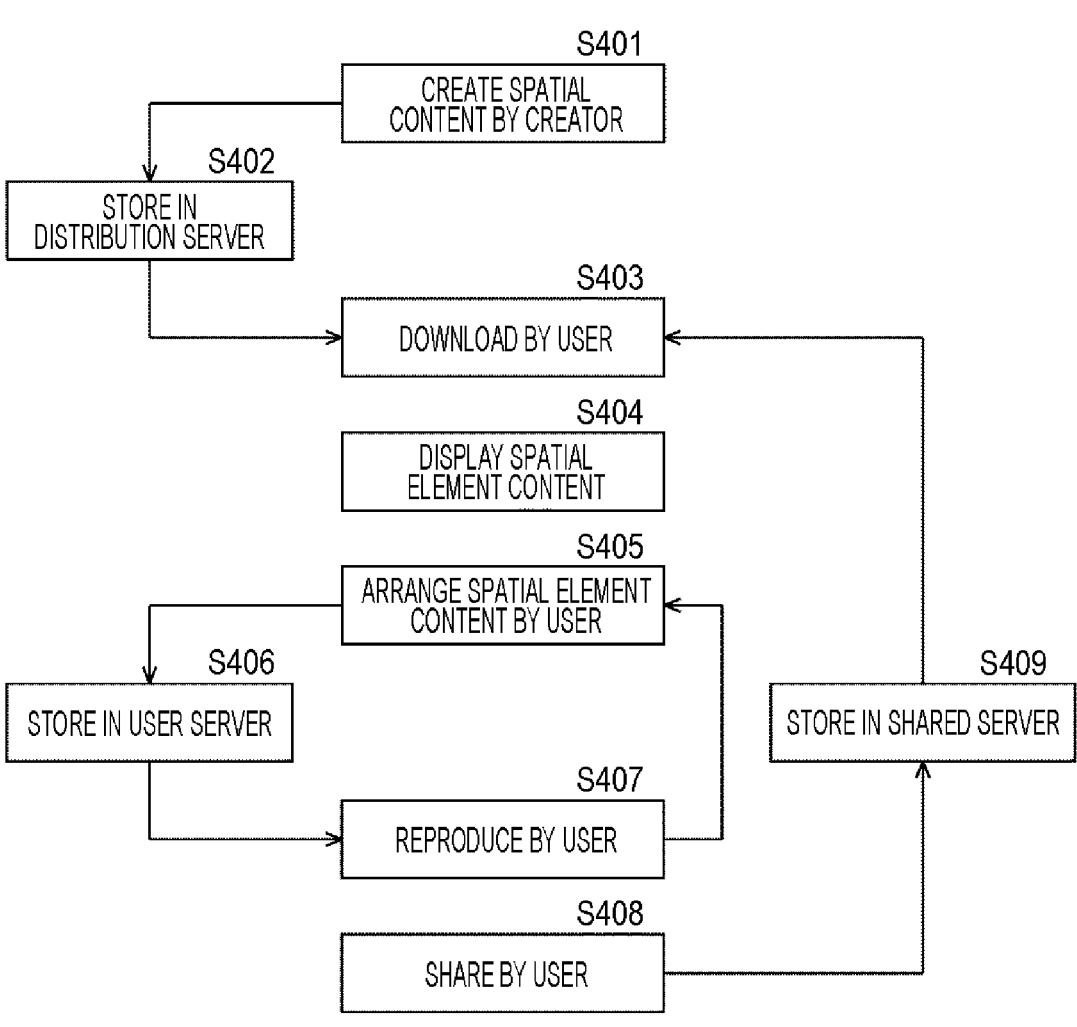
FIG. 38 is a diagram depicting a flow of retrieval, editing, and sharing of a spatial content by a user.

A spatial content edited (set) by the user can be shared with another user by means of social media such as a content sharing site or a social networking service (SNS). FIG. 38 is a diagram depicting a flow of retrieval, editing, and sharing of a spatial content by the user.

As depicted in FIG. 38, the creator creates spatial contents using a PC or the like (S401), and stores the spatial contents in the distribution server (S402). The user uses the device 10 to download a spatial content stored in the distribution server (S403). The spatial content is downloaded via the application.

In the device 10, the spatial element content is displayed by the application (S404), and the spatial element content is arranged by the user (S405). Here, the registration work (S104-1 to SS107-1 and S104-2 to SS107-2 in FIG. 10) regarding the spatial element content arrangement described above is performed, and the spatial element content is stored in the user server (S406). In the device 10, the spatial element content stored in the user server is reproduced (S407).

The user uses the device 10 to repeatedly retrieve and edit such a spatial element content and store and reproduce the edited spatial element content. Furthermore, in a case where the user shares the spatial element content edited by the user with another user, the user uses the device 10 to store the edited spatial element content in a shared server (S408, S409).

In the shared server, spatial element contents edited by various users are accumulated. It is therefore possible for the device 10 to access the shared server to retrieve the spatial element content edited by another user. That is, in the device 10, not only the spatial content (spatial element content) created by the creator but also the spatial element content edited by another user is downloaded (S403).

The device 10 can reproduce the spatial element content edited by another user. Furthermore, the user may further edit the spatial element content edited by another user.

As described above, the user can not only experience the spatial element content that is provided from the creator and is edited and reproduced by the user, but also experience the spatial element content edited by and shared with another user.

Note that, in FIG. 38, the distribution server, the user server, and the shared server correspond to the server 20 in FIG. 5. The shared server provides a function of sharing the spatial element content edited by the user with another user.

(Configuration of Computer)

The process of each step of the above-described flowcharts can be performed by hardware or software. In a case where the series of processing is performed by software, a program constituting the software is installed on a computer of each device.

The program executed by the computer can be provided, for example, by being recorded in a removable recording medium as a package medium or the like. Furthermore, the program can be provided via a wired or wireless transmission medium such as a local area network, the Internet, or digital broadcasting.

In the computer, the program can be installed on the storage unit via the input/output I/F by attaching the removable recording medium to the drive. Furthermore, the program can be received by the communication unit via a wired or wireless transmission medium and installed on the storage unit. In addition, the program can be installed in advance on the ROM or the storage unit.

Herein, the processing to be performed by the computer in accordance with the program is not necessarily performed on a time-series basis according to the sequences described in the flowcharts. That is, the processing to be performed by the computer in accordance with the program includes processing to be performed in parallel or individually (parallel processing or object-based processing, for example).

Furthermore, the program may be processed by one computer (processor) or may be subjected to distributed processing by a plurality of computers. Moreover, the program may be transferred to a remote computer, and be executed therein.

Furthermore, each step described in the above-described flowcharts can be performed by one device or performed by a plurality of devices in a shared manner. Moreover, in a case where a plurality of processes is included in one step, the plurality of processes included in one step can be performed by one device or by a plurality of devices in a shared manner.

Note that the embodiment of the present disclosure is not limited to the above-described embodiment, and various modifications are possible without departing from the scope of the present disclosure. Furthermore, for example, the embodiment of the present disclosure can be configured as cloud computing in which a plurality of devices shares one function and jointly performs processing via a network. Specifically, the cloud-side server 20 may include at least some of the functions of the example of the functional configuration of the local-side device 10 depicted in FIG. 7 or FIG. 8.

Herein, the system means a set of a plurality of components (devices or modules (parts) and the like), and it does not matter whether or not all the components are in the same housing. Therefore, a plurality of devices housed in separate housings and connected via a network, and a single device with a plurality of modules housed in one housing are both systems.

Furthermore, the effects described herein are merely examples and are not limited to the examples, and may include other effects.

Furthermore, the present disclosure can have the following configurations.

(1)

An information processing device including:

a control unit configured to identify, with at least one target, a content for each of the targets, and a reproduction range of the content set in advance, a relative position between the target and a device and compare the reproduction range with the relative position; and a reproduction unit configured to reproduce the content on the basis of a result of the comparison between the reproduction range and the relative position.

(2)

The information processing device according to the above (1), in which the reproduction range has a predetermined shape, a position of the target and a position for identifying a shape of the reproduction range are associated with each other in advance by a vector, and the control unit compares a first vector connecting a position of the device and the position of the target with a second vector connecting the position of the target and the position for identifying the shape of the reproduction range to determine whether or not the position of the device is within the reproduction range.

(3)

The information processing device according to the above (2), in which the reproduction range has any one of a circular shape, a polygonal shape, a spherical shape, or a polyhedral shape, and the position for identifying the shape of the reproduction range includes a center of a circle or a sphere, or a vertex of a polygon or a polyhedron.

(4)

The information processing device according to any one of the above (1) to (3), in which the control unit identifies the relative position on the basis of an absolute position of the target set on a map and an absolute position of the device on the map.

(5)

The information processing device according to the above (4), in which the map is a map based on topographical map information or environmental map information generated according to an environment around the device.

(6)

The information processing device according to any one of the above (1) to (5), in which the target is associated with a target object in advance by target information, and the control unit identifies a relative position between the device and the target object on the basis of a vector indicating the relative position.

(7)

The information processing device according to the above (6), in which the target object includes any physical object, the target information includes at least information regarding an image of the physical object registered by a user who uses the device, and the control unit calculates the vector indicating the relative position between the device and the target object on the basis of information obtained as a result of measurement using the target information as an image marker.

(8)

The information processing device according to the above (6), in which the target object includes an item sold by a business operator, the target information includes at least information regarding an image of the item registered by the business operator, and the control unit calculates the vector indicating the relative position between the device and the target object on the basis of information obtained as a result of measurement using the target information as an image marker.

(9)

The information processing device according to the above (6), in which the target object includes a signal transmission unit, and the control unit calculates the vector indicating the relative position between the device and the target object on the basis of a signal transmitted from the signal transmission unit.

(10)

The information processing device according to any one of the above (1) to (9), in which the control unit sets the target, the content, and the reproduction range according to operation made by a user who uses the device.

(11)

The information processing device according to any one of the above (1) to (10), in which the control unit detects meta-information set for each of the targets, and the reproduction unit reproduces the content on the basis of a result of the detection of the meta-information.

(12)

The information processing device according to the above (10), in which the control unit determines, on the basis of an absolute position of a first target arranged by the user and a relative positional relationship between the targets set in advance, an absolute position of a second target that is not arranged by the user, and arranges the second target on the basis of the absolute position of the second target.

(13)

The information processing device according to the above (12), in which the relative positional relationship includes at least information regarding a distance and an angle between one of the targets as a reference and another one of the targets.

27

(14)
The information processing device according to the above
(12) or (13), in which
the control unit detects meta-information, and determines
the absolute position of the second target on the basis
of the relative positional relationship and the meta-
information.
(15)
The information processing device according to the above
(14), in which
the control unit collates the meta-information of the
second target with meta-information on the map while
maintaining the relative positional relationship.
(16)
The information processing device according to any one
of the above (1) to (15), in which
the information processing device is configured as the
device.
(17)
An information processing method including causing an
information processing device to:
identify, with at least one target, a content for each of the
targets, and a reproduction range of the content set in
advance, a relative position between the target and a
device;
compare the reproduction range with the relative position;
and
reproduce the content on the basis of a result of the
comparison between the reproduction range and the
relative position.
(18)
A program causing a computer to function as:
a control unit configured to identify, with at least one
target, a content for each of the targets, and a repro-
duction range of the content set in advance, a relative
position between the target and a device and compare
the reproduction range with the relative position; and
a reproduction unit configured to reproduce the content on
the basis of a result of the comparison between the
reproduction range and the relative position.

REFERENCE SIGNS LIST

1 Information processing system
10, 10-1 to 10-N Device
20 Server
30 Network
101 CPU
102 ROM
103 RAM
104 Bus
105 Input unit
106 Output unit
107 Storage unit
108 Communication unit
109 Near-field wireless communication unit
110 Input/output interface
111 Operation unit
112 Camera unit
113 Sensor unit
114 GPS unit
121 Display unit
122 Sound output unit
151 Target/reproduction range setting unit
152 Absolute position detection unit
153 Relative position calculation unit
154 Relative position detection unit

28

155 Target/device relative position identification unit
156 Reproduction range/relative position comparison unit
157 Content reproduction unit
161 Meta-information detection unit
162 Meta-information/reproduction condition compari-
son unit

The invention claimed is:
1. An information processing device, comprising:
a control unit configured to:
identify content for each of at least one target, wherein
a reproduction range of the content is set in advance;
identify a relative position between a target of the at
least one target and a device; and
compare the reproduction range with the relative posi-
tion; and
a reproduction unit configured to reproduce the content
based on a result of the comparison between the
reproduction range and the relative position.
2. The information processing device according to claim
1, wherein
the reproduction range has a specific shape,
a position of the target and a position for identification of
a shape of the reproduction range are associated with
each other in advance by a vector, and
the control unit is further configured to:
compare a first vector that connects a position of the
device and the position of the target with a second
vector that connects the position of the target and the
position for the identification of the shape of the
reproduction range; and
determine, based on the comparison of the first vector
and the second vector, whether the position of the
device is within the reproduction range.
3. The information processing device according to claim
2, wherein
the reproduction range has one of a circular shape, a
polygonal shape, a spherical shape, or a polyhedral
shape, and
the position for the identification of the shape of the
reproduction range includes a center of a circle or a
sphere, or a vertex of a polygon or a polyhedron.
4. The information processing device according to claim
1, wherein the control unit is further configured to identify
the relative position based on an absolute position of the
target set on a map and an absolute position of the device on
the map.
5. The information processing device according to claim
4, wherein the map is a map based on topographical map
information or environmental map information generated
based on an environment around the device.
6. The information processing device according to claim
1, wherein
the target is associated with a target object in advance by
target information, and
the control unit is further configured to identify a relative
position between the device and the target object based
on a vector indicating the relative position.
7. The information processing device according to claim
6, wherein
the target object includes any physical object,
the target information includes at least information
regarding an image of the physical object registered by
a user associated with the device, and the control unit is further configured to calculate the vector indicating the relative position between the device and the target object based on information, wherein the information is obtained as a result of measurement based on the target information as an image marker.

8. The information processing device according to claim 6, wherein the target object includes an item sold by a business operator, the target information includes at least information regarding an image of the item registered by the business operator, and the control unit is further configured to calculate the vector indicating the relative position between the device and the target object based on information, wherein the information is obtained as a result of measurement based on the target information as an image marker.

9. The information processing device according to claim 6, wherein the target object includes a signal transmission unit, and the control unit is further configured to calculate the vector indicating the relative position between the device and the target object based on a signal transmitted from the signal transmission unit.

10. The information processing device according to claim 1, wherein the control unit is further configured to set the target, the content, and the reproduction range based on an operation by a user uses-associated with the device.

11. The information processing device according to claim 1, wherein the control unit is further configured to detect meta-information set for each of the at least one target, and the reproduction unit is further configured to reproduce the content based on a basis of a result of the detection of the meta-information.

12. The information processing device according to claim 10, wherein the control unit is further configured to:

determine, based on an absolute position of a first target arranged by the user and a relative positional relationship between the at least one target set in advance, an absolute position of a second target that is not arranged by the user; and arrange the second target based on the absolute position of the second target.

13. The information processing device according to claim 12, wherein the relative positional relationship includes at least information regarding a distance and an angle between a third target of the at least one target and a fourth target of the at least one target, and the third target is a reference.

14. The information processing device according to claim 12, wherein the control unit is further configured to:

detect meta-information of the second target; and determine the absolute position of the second target based on-a basis of the relative positional relationship and the meta-information.

15. The information processing device according to claim 14, wherein the control unit is further configured to:

collate the meta-information of the second target with meta-information on a map; and maintain the relative positional relationship at a time of the collation of the meta-information.

16. The information processing device according to claim 1, wherein the information processing device is configured as the device.

17. An information processing method, comprising:

identifying, by a control unit of an information processing device, content for each of at least one target, wherein reproduction range of the content is set in advance;

identifying, by the control unit, a relative position between a target of the at least one target and a device;

comparing, by the control unit, the reproduction range with the relative position; and reproducing, by a reproduction unit of the information processing device, the content based on a result of the comparison between the reproduction range and the relative position.

18. A non-transitory computer-readable medium having stored thereon, computer-executable instructions which, when executed by a computer, cause the computer to execute operations, the operations comprising:

identifying content for each of at least one target, wherein a reproduction range of the content is set in advance;

identifying a relative position between a target of the at least one target and a device;

comparing the reproduction range with the relative position; and reproducing the content based on a result of the comparison between the reproduction range and the relative position.

\* \* \* \* \*